US012033455B2

(12) United States Patent
Deckoff et al.

(10) Patent No.: US 12,033,455 B2
(45) Date of Patent: Jul. 9, 2024

(54) CARD-BASED ELECTRONIC GAMING SYSTEM FOR CONTINUOUS TABLE GAME PROGRESSION

(71) Applicant: Generaztion Z, LLC, Columbus, MN (US)

(72) Inventors: Stephen Deckoff, St. John, VI (US); Tom W. Bowling, Jr., Los Angeles, CA (US)

(73) Assignee: Generaztion Z, LLC, Columbus, OH (US)

( * ) Notice: Subject to any disclaimer, the term of this patent is extended or adjusted under 35 U.S.C. 154(b) by 0 days.

(21) Appl. No.: 17/478,173

(22) Filed: Sep. 17, 2021

(65) Prior Publication Data

US 2023/0086679 A1 Mar. 23, 2023

(51) Int. Cl.
*G07F 17/32* (2006.01)

(52) U.S. Cl.
CPC ........ *G07F 17/3209* (2013.01); *G07F 17/322* (2013.01); *G07F 17/3293* (2013.01)

(58) Field of Classification Search
CPC . G07F 17/3209; G07F 17/322; G07F 17/3293
See application file for complete search history.

(56) References Cited

U.S. PATENT DOCUMENTS 5,200,890 A 4/1993 Pionchon
5,489,101 A 2/1996 Moody
6,132,311 A 10/2000 Williams
6,508,709 B1 1/2003 Karmarkar
6,511,068 B1 1/2003 Sklansky et al.
(Continued)

FOREIGN PATENT DOCUMENTS

WO WO 2008/091809 7/2008

OTHER PUBLICATIONS

'www.linkedin.com' [online]. "Multi-hand MultiDraw Poker," Jul. 10, 2017 [retrieved on Jul. 25, 2017]. Retrieved from the Internet: URL <www.linkedin.com/pulse/multi-hand-multidraw-poker-timothy-nottke>. 10 pages.

(Continued)

*Primary Examiner* — Ronald Laneau
(74) *Attorney, Agent, or Firm* — Barnes & Thornburg LLP

(57) ABSTRACT

Described is an electronic gaming system using common physical cards having a scanner that identifies cards dealt by a dealer, a gaming table where the cards are dealt and scanned, player computing equipment that provide individualized gaming interfaces for players, and a gaming computing system connected to the scanner and player computing equipment that, based on candidate card sets being successively dealt and scanned, continuously identifies the candidate sets, receives a first request for cards from a first player computing device and a second request for cards from a second player computing device, identifies, among the candidate sets, first and second sets of the cards for the first and second requests, respectively, and transmits data representative of the first and second sets to the first and second player computing devices, respectively. The first and second requests are received at different times and the first and second sets include different cards.

20 Claims, 18 Drawing Sheets

(56) References Cited

U.S. PATENT DOCUMENTS

| | | | |
|---|---|---|---|
| 8,113,934 B2 | 2/2012 | Moody | |
| 8,152,641 B2 | 4/2012 | Hill | |
| 8,192,267 B2 | 6/2012 | Acres | |
| 8,287,380 B2 | 10/2012 | Nguyen et al. | |
| 8,414,403 B2 | 4/2013 | Denham | |
| 8,425,298 B2 | 4/2013 | Moody | |
| 8,708,809 B2 | 4/2014 | Sanford | |
| 10,198,913 B1 * | 2/2019 | Deckoff | A63F 1/02 |
| 10,235,844 B1 | 3/2019 | Barksdale et al. | |
| 10,861,291 B1 | 12/2020 | Bowling, Jr. et al. | |
| 10,930,120 B1 * | 2/2021 | Ito | A63F 1/00 |
| 10,970,973 B1 | 4/2021 | Deckoff et al. | |
| 11,462,078 B1 * | 10/2022 | Bowling, Jr. | G07F 17/3211 |
| 2003/0162424 A1 | 8/2003 | Berman | |
| 2003/0236113 A1 | 12/2003 | Webb | |
| 2005/0020338 A1 | 1/2005 | Stein | |
| 2007/0145684 A1 | 6/2007 | Webb et al. | |
| 2008/0015030 A1 | 1/2008 | Baazov | |
| 2008/0207294 A1 | 8/2008 | Sklansky et al. | |
| 2009/0111573 A1 | 4/2009 | Iddings | |
| 2009/0111574 A1 | 4/2009 | Rowe | |
| 2010/0004051 A1 | 1/2010 | Walker et al. | |
| 2010/0090405 A1 | 4/2010 | Snow | |
| 2010/0117299 A1 | 5/2010 | Nicely | |
| 2010/0222132 A1 | 9/2010 | Sanford | |
| 2011/0195766 A1 | 8/2011 | Toompere | |
| 2011/0300917 A1 | 12/2011 | Hill | |
| 2012/0270637 A1 | 10/2012 | Lutaick et al. | |
| 2013/0084962 A1 | 4/2013 | Radisich | |
| 2013/0196777 A1 | 8/2013 | Hill | |
| 2014/0357338 A1 | 12/2014 | Pockaj | |
| 2015/0065227 A1 | 3/2015 | Naylor et al. | |
| 2016/0012663 A1 | 1/2016 | Chun | |
| 2016/0071366 A1 | 3/2016 | Lind et al. | |
| 2016/0078709 A1 | 3/2016 | Stanford et al. | |
| 2018/0089958 A1 | 3/2018 | Gordon | |

OTHER PUBLICATIONS

Dionne et al., "Large volume flow rate acoustiophoretic phase separator for oil water emulsion splitting." Proceedings of Meetings on Acoustics, vol. 19 (Jun. 2, 2013), pp. 1-8. (Year: 2013).

Dutra et al., "Macro-scale acoustophoretic separation of lipid particles from red blood cells." Proceedings of Meetings on Acoustics, vol. 19(Jun. 2, 2013), pp. 1-7, (Year: 2013).

Lipkens et al., "Separation of bacterial spores from flowing water in macro-scale cavities by ultrasonic standing waves," arXiv upload (Jun. 2010), 1-11. (Year: 2010).

* cited by examiner

CARD-BASED ELECTRONIC GAMING SYSTEM FOR CONTINUOUS TABLE GAME PROGRESSION

TECHNICAL FIELD

This document generally describes devices, systems, and methods related to electronic gaming systems that provide electronic gaming, such as five-card draw poker gaming, using physical cards.

BACKGROUND

Electronic gaming systems and devices have traditionally relied on random number generators to determine gaming outcomes that are displayed to players as part of the game. Additionally, electronic gaming systems receive player inputs based on the displayed gaming outcomes. For example, while a number of variations exist, electronic gaming devices typically deal a number of cards based on the type of game being played. Electronic gaming devices may allow the player to discard cards from the original hand and/or receive additional/replacement cards. An outcome of the game (e.g., whether the player won and the odds that apply to the win) may then be determined based on the final resulting hand. Each of the cards in the initial hand and the drawn cards (additional or replacement cards) can be determined by the electronic gaming devices using random number generators that are implemented by the electronic gaming devices. Players can play different games but can receive same sets of cards as other players who play different games. The players can also play at different paces relative to each other.

Moreover, poker is a game of skill with a large number of variations, including variations in the structure and format of the game play, player actions (e.g., betting, discarding and drawing new cards), and the determination of gaming outcomes (e.g., best hand among players who have not folded their hands wins, fixed schedule of payouts depending on hand). In general, poker games use a hierarchy of poker hands to compare player hands and to determine a winner (or winners in the case of multiple players having the same poker hand). One variation of poker is five-card draw, which itself has several variations. In general, five-card draw poker games involve dealing each player an initial hand of five cards, permitting each player to discard some or all of the cards in his/her initial hand, and then replacing the discards with newly drawn cards from the deck.

Electronic gaming systems and equipment have borrowed the hierarchy of poker hands and assigned values to each of the hands to provide electronic gaming whereby players attempt to make poker hands with the greatest value and corresponding payout. Electronic gaming systems and equipment have been designed, for example, to provide a variation on five-card draw poker in which poker gaming equipment typically deal a player five cards and allow the player to discard anywhere from zero to all five of the cards in the initial hand. These electronic gaming systems then replace each of the discarded cards with additionally "drawn" card(s) and determine the outcome of the game (e.g., whether the player won and the odds that apply to the win) based on the final resulting hand as it is compared to the values assigned to the hierarchy of poker hands for the game.

SUMMARY

The document generally describes electronic gaming systems. More particularly, this document describes electronic gaming techniques for card games (e.g., five-card draw poker games) based on physical cards (e.g., playing cards) dealt at a physical gaming table. The electronic gaming techniques described herein can deal common cards for accommodating multiple players who play the games at different timings and/or paces. For example, sets of cards can be continuously dealt at a physical gaming table (for example by a dealer) at a relatively fast rate or a desired rate. While being continuously dealt, each set of cards can be ready to be presented to each of multiple players and used for a particular stage of the game being currently played by each of the players. For example, while cards are being continuously dealt at the table, each player can be presented with some or all of the cards that are dealt at a particular moment that the player requests a set of cards. As a result, each player can play one or more games at their preferred pace, without being affected by paces and play stages of the other players at the physical gaming table or other players that are remote from the physical gaming table.

In general, while five-card draw poker using physical cards traditionally involves dealing each player at a table with his/her own cards to create a five-card poker hand, card-based electronic gaming systems for five-card draw poker can be programmed to deal common cards that are used by all players who are playing at a particular table, including cards that are drawn based on player actions. For instance, in one example of a five-card draw poker game provided with common cards via a dealer-assist electronic gaming system, a dealer can physically deal five cards (e.g., scan five physical cards from a deck/shoe of cards). For players who start the game at a same time, the system reads and applies the dealt cards as the initial base hand for each of those players at a table (physical and/or virtual table) or who playing using remote computing devices (e.g., mobile devices remote from the table). The initial hand can be the same for each player who starts the game or otherwise requests cards at a same time. At the same time, for players who have already started the game earlier (and thus are in the middle of the game), the system applies the dealt cards as replacement cards for those players. The dealt cards can be presented on displays for each player (e.g., display equipment embedded in/attached to a gaming table, mobile display equipment), but can be used for different purposes, namely as the initial hand for players who has just started the game, or as a set of replacement cards for players who are in the middle of the game and have selected which of the five cards they want to discard through an electronic user interface.

The dealer can continuously deal sets of cards that are physically drawn (from the deck/shoe) by the dealer, read by the system, and applied across the players' hands that are at different stages of the game. In one example, the dealt card can be applied to players' hands based on an order with which the cards were drawn and a number of cards that were discarded by each player. For example, if a first player discards the first and fifth card from the initial hand at a first time, the first player's resulting hand will include the second, third, and fourth cards from the initial hand and the first and second cards that are drawn by the dealer at the first time. Moreover, if a second player discards the second and third cards from the initial hand at a second time, the second player's resulting hand will include the first, fourth, and fifth cards from the initial hand and the first and second cards that are drawn by the dealer at the second time.

In another example, if a third player discards no cards from the initial hand, then the third player's resulting hand will be the initial hand (even though cards are continuously being drawn at different time intervals and provided to other players who perform some action to the cards in their hands). In a further example, if a fourth player discards all five cards from the initial hand at a third time, then the fourth player's resulting hand will be the five cards that are drawn at the third time by the dealer. Each of these first-fourth players are playing using a common initial hand and cards that are drawn at different times, which means they each have different hands resulting from the discard and draw, and potentially different gaming outcomes. The disclosed technology can also provide for determining replacement cards for each player based on an order or layout of the cards in a grid configuration/layout.

One or more embodiments described herein can include an electronic gaming system using common physical cards, the system having physical playing cards, a scanner that can identify each of the physical playing cards as they are dealt by a dealer, a gaming table where the physical playing cards are dealt and identified by the scanner, and player computing equipment with graphical displays that can be programmed to provide individualized gaming interfaces for players. The individualized gaming interfaces each can be programmed to output a virtual poker hand for a corresponding player, receive user input to perform one or more discard actions with regard to the virtual draw poker hand, and transmit, to a gaming computing system, a request for a set of replacement cards. The system can also include a gaming computing system that can be communicably connected to the scanner and the player computing equipment. The gaming computing system can be programmed to, based on candidate sets being successively dealt by the dealer and detected by the scanner, continuously identify the candidate sets of the physical playing cards, receive, from a first player computing device of the player computing devices, a first request for cards, receive, from a second player computing device of the player computing devices, a second request for cards, identify, among the candidate sets of the physical playing cards, a first set of the physical playing cards in response to the first request from the first player computing device, identify, among the candidate sets of the physical playing cards, a second set of the physical playing cards in response to the second request from the second player computing device, transmit, to the first player computing device, data representative of the first set of the physical playing cards, and transmit, to the second player computing device, data representative of the second set of the physical playing cards.

In some implementations, the embodiments described herein can optionally include one or more of the following features. For example, the gaming computing system can receive the first request and the second request at different times. The first request can be generated at the first player computing device at a different time from a time when the second request can be generated at the second player computing device.

As another example, the first request for cards can include a first timestamp transmitted from the first player computing device, and the gaming computing system can be programmed to identify the first set of the physical playing cards that has been dealt by the dealer or detected by the scanner at or immediately before the first timestamp. Moreover, the first request for cards can include a second timestamp transmitted from the first player computing device, and the second request for cards can include the second timestamp transmitted from the second player computing device. The gaming computing system can then be programmed to identify the second set of the physical playing cards that has been dealt by the dealer or detected by the scanner at or immediately before the second timestamp, and transmit the second set of the physical playing cards to the first player computing device and the second player computing device, respectively. In some implementations, the second set of the physical playing cards can be used as an initial hand for the second player computing device and a replacement set for the first player computing device.

As yet another example, the gaming computing system can be programmed to identify the first set of the physical playing cards that has been dealt by the dealer or detected by the scanner at or immediately before receiving the first request for cards from the first player computing device. In some implementations, the gaming computing system can be programmed to identify the second set of the physical playing cards that has been dealt by the dealer or detected by the scanner at or immediately before receiving the second request for cards from the second player computing device. Moreover, the gaming computing system can receive the first request and the second request at different times. Sometimes, the first request can be generated at the first player computing device at a different time from a time when the second request can be generated at the second player computing device. In some implementations, the gaming computing system can receive the first request and the second request at the same time, and the first set of the physical playing cards can be the same as the second set of the physical playing cards.

In some implementations, the first request for cards can include a first timestamp transmitted from the first player computing device, and the gaming computing system can be programmed to identify the first set of the physical playing cards that has been dealt by the dealer or detected by the scanner within a threshold range of time from the first timestamp. In some implementations, the second request for cards can include a second timestamp transmitted from the second player computing device, and the gaming computing system can be programmed to identify the second set of the physical playing cards that has been dealt by the dealer or detected by the scanner within a threshold range of time from the second timestamp. In yet some implementations, the first set of the physical playing cards can be different than the second set of the physical playing cards.

As another example, the first request for cards can be received based on a discard action being performed at the first player computing device, where the discard action can include discarding between zero and five cards from the initial poker hand of the corresponding player, the first set of the physical playing cards can be in a card sequence, and the gaming computing system can be further programmed to replace, based on at least one card having been discarded, a first discarded card from the initial poker hand with a first card from the card sequence of the first set of the physical playing cards, replace, based on at least two cards having been discarded, a second discarded card from the initial poker hand with a second card from the card sequence of the first set of the physical playing cards, replace, based on at least three cards having been discarded, a third discarded card from the initial poker hand with a third card from the card sequence of the first set of the physical playing cards, replace, based on at least four cards having been discarded, a fourth discarded card from the initial poker hand with a fourth card from the card sequence of the first set of the physical playing card, and replace, based on all five cards from the initial poker hand having been discarded, a fifth discarded card from the initial poker hand with a fifth card from the card sequence of the first set of the physical playing cards.

As yet another example, the second request for cards can be received based on a discard action being performed at the second player computing device, where the discard action can include discarding between zero and five cards from the initial poker hand of the corresponding player, the second set of the physical playing cards can be in a card sequence, and the gaming computing system can be further programmed to replace, based on at least one card having been discarded, a first discarded card from the initial poker hand with a first card from the card sequence of the second set of the physical playing cards, replace, based on at least two cards having been discarded, a second discarded card from the initial poker hand with a second card from the card sequence of the second set of the physical playing cards, replace, based on at least three cards having been discarded, a third discarded card from the initial poker hand with a third card from the card sequence of the second set of the physical playing cards, replace, based on at least four cards having been discarded, a fourth discarded card from the initial poker hand with a fourth card from the card sequence of the second set of the physical playing card, and replace, based on all five cards from the initial poker hand having been discarded, a fifth discarded card from the initial poker hand with a fifth card from the card sequence of the second set of the physical playing cards.

In some implementations, at least a portion of the player computing equipment can be remote from a facility where the gaming table is located or remote from the gaming table in the same facility where the gaming table is located. The scanner can include one or more of: an RFID reader, an optical scanner, a barcode scanner, and a camera. Moreover, the dealer can be at least one of a human and a robot.

One or more preferred embodiments described herein includes an electronic gaming system using common cards, the system having a gaming computing system that can be communicably connected to a scanner and player computing equipment. The scanner can identify each of physical playing cards as they are dealt by a dealer. The player computing equipment can have graphical displays that can be programmed to provide individualized gaming interfaces for players, where at least a portion of the player computing equipment can be remote from a gaming table where the physical playing cards are dealt and identified by the scanner. The gaming computing system can be programmed to, based on candidate sets being successively dealt by the dealer and detected by the scanner, continuously identify the plurality of candidate sets of the physical playing cards, receive, from a first player computing device of the player computing devices, a first request for cards that can be based on user input to perform a discard action with regard to a virtual draw poker hand, receive, from a second player computing device of the player computing devices, a second request for cards that can be based on user input to join a virtual poker game and receive an initial virtual draw poker hand, identify, among the candidate sets of the physical playing cards, a first set of the physical playing cards in response to the first request from the first player computing device, identify, among the candidate sets of the physical playing cards, a second set of the physical playing cards in response to the second request from the second player computing device, transmit, to the first player computing device, data representative of the first set of the physical playing cards, and transmit, to the second player computing device, data representative of the second set of the physical playing cards.

In some implementations, the embodiments described herein can optionally include one or more of the abovementioned features.

The devices, system, and techniques described herein may provide one or more of the following advantages. For example, table-based card gaming (e.g., five-card draw gaming) can be provided to a large number of players from a single table. Traditional table games have a limited number of seats available for players. For example, poker-based table games may limit the number of players anywhere from five to eight players. In contrast, electronic gaming systems that are using common cards that are being continuously dealt can allow participation of players at the physical table where the cards are being dealt as well as players who are remote from the table and/or connected to the table virtually, and allow players to participate in the game at different times and play at different paces. This can expand the number of players (beyond just those seated at the physical table) for a single table to include a large number of players who may be playing remotely from a location within a gaming facility (e.g., casino, card club, race track) and/or over the internet. Additionally, the number of players can be expanded without concern for the ratio of players to remaining cards in the deck/shoe. For example, conventional five-card poker uses a large number of cards per player—requiring a dealer's shoe/deck to have up to ten cards available for each player per hand, which can limit the number of players who are able to play each hand. Through common card five-card draw poker, a nearly limitless number of players can play each hand, which only requires up to ten cards total available per hand regardless of the number of players. This reduction in the resources, both physical (in terms of cards and dealer time to deal out each hand) and electronic (in terms of computing resources used to process game play, such as processor cycles, memory, network traffic, etc.), can make game play more efficient and faster. Additionally, even though common card five-card draw poker provides greater efficiencies, it still permits each player to individually make moves (e.g., designate cards to be discarded) regardless of whether they are seated at the physical table or remote, which can improve player engagement while maintaining gaming efficiencies.

Moreover, the disclosed technology provides for players to play at their own paces without compromising any player's gameplay. A dealer can continuously deal physical cards at a table at different time intervals. Players, both at the table and remote from the table, can perform actions on their hands, such as discarding cards, at different times, and the dealer at the table do not have to wait for all the players to perform the actions to move on to a next stage of the game. When a player performs such an action, a request can be transmitted to the dealer's computing system for replacement cards. The dealer's computing system can transmit cards that were dealt at a same or similar time as a time of the request. Thus, a fast player may not be held up waiting for a set of replacement cards to be dealt because of a slower player at the table or remote from the table. For example, a first and second player can start a poker game at the same time. The first and second players can receive a same initial hand of cards that are dealt by the dealer. The first player can quickly discard one or more cards from the initial hand and send a request to the dealer computing system for replacement cards at a first time. The second player can be slower and may discard cards from the initial hand and send a request for replacement cards at a second time. The second time can be any length of time after the first time. The dealer computing system can transmit a set of cards that were dealt at the first time to the first player and a set of cards that were dealt at the second time to the second player. The first player can therefore continue their gameplay at their desired pace, regardless of what pace the second player plays at. Thus, players can play at their desired paces without being slowed down or forced to act faster by other players.

In another example, by using common cards instead of individual cards, the number of cards that are used per hand can be decreased (e.g., decrease from up to 10 cards per player per hand to up to 10 cards total per hand regardless of the number of players), which can create greater efficiencies, can increase the number of hands that are able to be played per shoe, and decrease the amount of time that is spent switching between/shuffling shoes. Thus, the amount of time taken away from game play (due to shoe shuffling/replacement) can be reduced, the electronic and physical resources that are allocated per player can be reduced, and the amount of time dedicated to game play can be increased.

As another example, electronic five-card poker gaming can be provided in jurisdictions (e.g., cities, counties, states, countries) that prohibit gaming outcomes based on random number generators and pseudo-random number generators. Conventional electronic five-card poker gaming, like electronic five-card draw poker equipment, has relied on computer-based random number generators and pseudo-random number generators to electronically determine which cards are dealt to players. Some jurisdictions prohibit the use of random and pseudo-random number generators to determine gaming action and outcomes—meaning that in those jurisdictions, conventional electronic five-card poker gaming, like electronic five-card draw poker equipment, is prohibited in gaming facilities. By providing five-card draw poker with common cards that are continuously dealt with dealer-assist electronic gaming systems, electronic poker gaming can be provided to players in these jurisdictions that prohibit random and pseudo-random number generators because the gaming action and outcomes are determined by physical cards that are physically dealt by a dealer.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
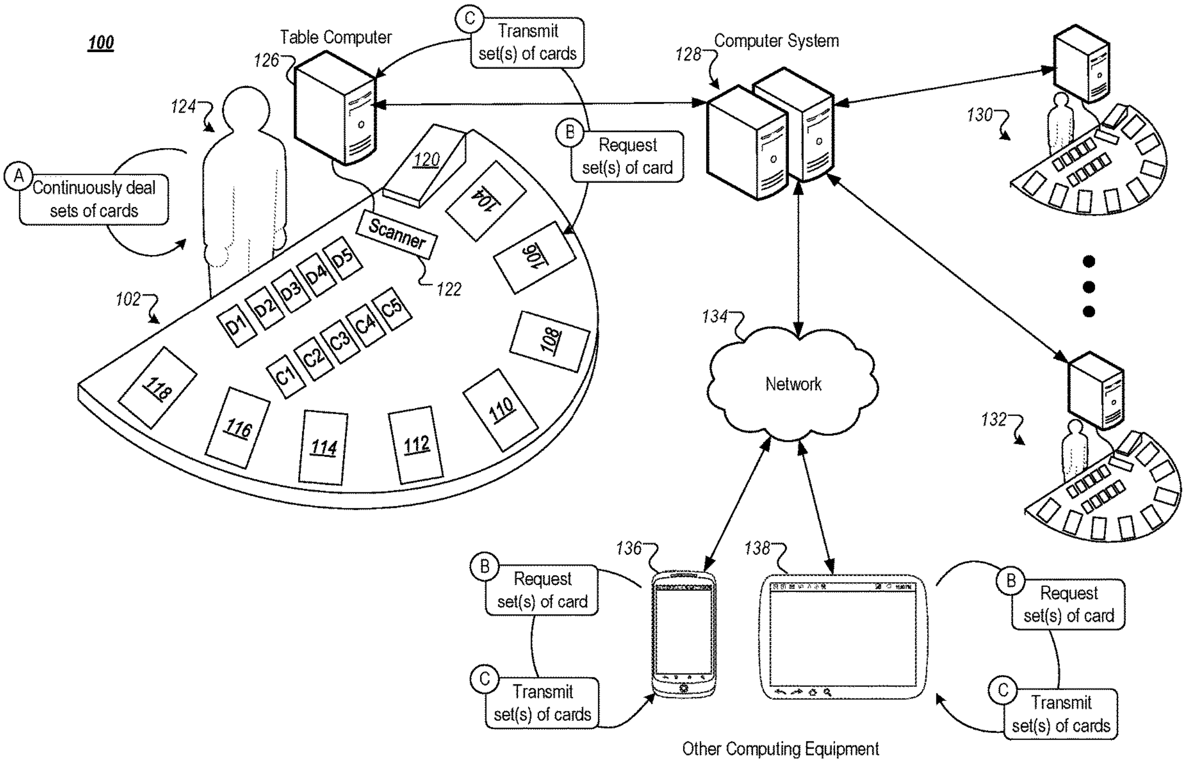
FIGS. 1A-B are conceptual diagrams of an example card-based electronic five-card draw poker gaming system.

This document relates to electronic gaming systems and continuous progression of gameplay regardless of pacing and/or stages of gameplay of each player at a physical gaming table or remote from the gaming table. When multiple players are involved, each player can play a game at different paces. For example, some players can leave the game and come back to it at a later time. Other players can focus only on one game and can make quick gameplay decisions that cause them to play the game relatively faster than other players. The disclosed technology provides for allowing players to play at their desired paces without being slowed down or pressured to play faster by other players. As described herein, a dealer can continuously deal sets of cards that can be ready the moment they are dealt to be transmitted to electronic gaming equipment of one or more players. For example, some players can start a game at the same time and can all receive a same set of first cards. A first player can quickly discard some cards while keeping others. The first player can then send a request to the electronic gaming system for a new set of cards to replace the discarded ones. This request can be sent at a first time. A second player can take a longer amount of time to determine which cards to discard and therefore can send a request for replacement cards at a second time that is later than the first time. The first player can therefore receive whatever set of cards were dealt at or around the first time while the second player can receive whatever set of cards were dealt at or around the second time. The two players can then continue to play the game at their desired paces without being held back or speeding up to maintain a similar pace of gameplay as each other. Further, some players can join and start their games at any later time while other players are already in their games at their own paces.

Moreover, the gaming systems described herein can allow players to play side bets. For example, several types of side bets can be added to a five-card draw poker game that is primarily described therein. Even more possibilities may arise for placing side bets when dealing cards on a twenty-five card grid or another grid structure that is described herein.

In addition, the gaming systems described herein can allow players to tip dealers to reimburse or otherwise reward the dealers for a positive gaming experience. For example, the players can make straight donations to the dealers using one or more options that are presented on player computing devices. The players can also tip the dealers in the form of betting for the dealer, along with the players' own hands.

This document describes a variety of different features, which can be selected and incorporated into gaming systems and equipment in various combinations. For example, different jurisdictions can have different gaming regulations outlining gaming features that are permitted within the jurisdictions. Features that are compliant with the gaming regulations for a jurisdiction can be implemented (e.g., activated, included) in gaming systems and equipment deployed in that jurisdiction, and other features that are not permitted within the jurisdiction can be deactivated/not included.

Figure 1B:
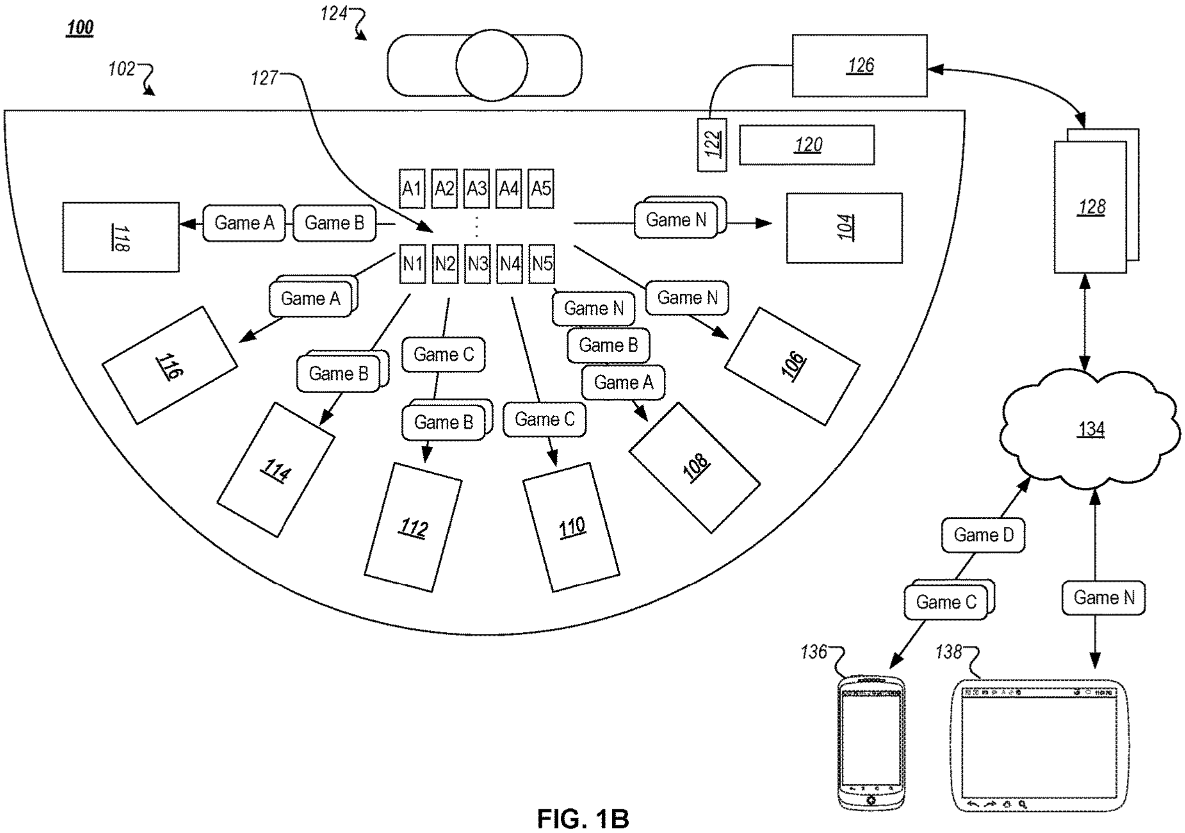

Referring to the figures, FIGS. 1A-B are conceptual diagrams of an example card-based electronic five-card draw poker gaming system. FIG. 1A is a conceptual diagram of an example card-based electronic five-card draw poker gaming system 100. The system 100 includes an example gaming table 102 that includes player computer devices 104-118 (e.g., touchscreens, electronic screens or displays) that are located at each of the positions for the table 102. The table 102 also includes a scanner 122 that is configured to automatically detect cards that are dealt out of the shoe 120 by a dealer 124. The scanner 122 can be implemented in any of a variety of ways, such as an optical scanner that is configured to detect each card that is dealt from the shoe 120 through optical recognition of one or more unique portions of the cards (e.g., image recognition techniques to identify the suit and number for each card and/or to identify a code printed on each card, such as a barcode or QR code), radio frequency-based identification (e.g., recognition of RFID tags included in each card), and/or other identification techniques. The scanner 122 can be a barcode scanner, QR code scanner, camera (e.g., overhead camera(s) over the table 102), other optical scanner, RFID reader, or other radio frequency scanner that can accurately detect physical playing cards that are dealt by the dealer 124 (e.g., a human or a robot at a physical gaming table) and to use those dealt cards to provide electronic five card draw poker gaming outcomes to players. Gaming systems that use any of a variety of card scanners to obtain physical card information may be referred to as "dealer assist" gaming systems. In some implementations, the cards that are dealt out of the shoe 120 are specialized playing cards with one or more features (e.g., codes, RFID tags) that are specifically designed for detection by the scanner 122. In other implementations, the cards that are dealt out of the shoe 120 are standard playing cards without specially designed features.

Card-based electronic five-card draw poker gaming is provided at the table 102 through the use of table computer system 126 that, in combination with the scanner 122, detects the cards that are dealt from the shoe 120 by the dealer 124 (which can be a human, robot, or other mechanical dealing equipment/machine), manages gaming information and interactions through the player computer devices 104-118, and determines gaming outcomes based on the cards that are dealt and the player actions (as designated through the devices 104-118). The shoe 120 can store one or more decks of physical playing cards that are ordered within the shoe 120 through physical shuffling of the cards (e.g., machine shuffling, manual shuffling, or a combination thereof). Through these collective parts (table 102, table computer system 126, scanner 122, shoe 120, dealer 124, devices 104-118), the system 100 can provide dealer assist electronic five-card draw poker gaming to players through the use of physical cards.

Sometimes, the table computer system 126 is programmed to use common cards to provide five-card draw poker gaming across the players through the devices 104-118. Sometime, only some of the devices 104-118 can be occupied by players. Further, the players can join the game at different times before or while the cards are being dealt by the dealer 124 at the table 102. For example, the computing system 126 can detect an initial poker hand of cards C1-C5 dealt by the dealer 124 and can transmit information identifying the cards C1-C5 to the player devices (e.g., one, some or all of the devices 104-118) that are currently occupied by the players for game playing. Each of the occupied player devices, which can be any of a variety of computing system with an associated display (e.g., tablet computing equipment, embedded computing equipment), can present the initial hand C1-C5 to the players along with selectable options to discard some, none, or all of the cards C1-C5. For example, the devices 104-118 can present selectable buttons to discard or keep each of the cards C1-C5. In another example, the devices 104-118 can include physical buttons corresponding to each of the cards C1-C5 through which the player can designate which cards to keep or discard. Player actions can be maintained locally on the devices 104-118 and/or can be transmitted to the table computer system 126.

The dealer 124 can continuously deal sets of cards, one example of which is a set of cards D1-D5. The dealer 124 can deal cards at a particular interval, for example, every 5 seconds, 10 seconds, 15 seconds, 20 seconds, 30 seconds, etc. Since the dealer 124 is continuously dealing cards, whenever one of the players requests a new set of cards, they can immediately receive a set of cards that was dealt at a same time or similar time as a time of the request (e.g., a time shortly after the time of the request). The players can continue to play the game at their desired paces, without being slowed down by gameplay pacing of other players. 5 cards, such as the cards C1-C5, can be exposed, and the cards can continuously be shuffled into decks. Multiple players can then play off the same 5 cards at their desired paces. As a result, an entire process of the game may not be slowed down. Moreover, fast players may not have to wait for slower players to make decisions. Furthermore, the odds can become different since all the cards except for the 5 exposed cards are continuously being shuffled and transmitted to players based on times at which they request sets of cards. Continuous shuffling and dealing can therefore mitigate risk that multiple players may win with the same cards and/or replacement cards.

Since the dealer 124 is continuously shuffling and dealing sets of cards, players can join a game at any moment. The new player can receive cards that are dealt at a time at which the player joins the game. Another player currently playing the game can receive that same set of cards if the another player requests cards at a same or similar time as when the new player joins the game. Otherwise, the another player can receive a set of cards that are dealt at whatever time the another player requests the cards. As an example, the dealer 124 can deal 5 cards at a first time and a first player can receive these cards. A second player can join at a second time and the dealer 124 can deal a second set of cards at a third time. The second player can receive whatever cards are dealt at the third time. The first player can also receive replacement cards that were dealt at the third time. In some implementations, the second player can receive cards that were dealt at the first time when they join the game. Since 5 cards that are initially exposed for one player can be used as replacement cards for one or more other players, the disclosed technology provides for continuous game progression for multiple players who can have different gameplay paces.

The table computer system 126 and/or the player devices 104-118 can determine the outcome of the game for each player based on the initial poker hand C1-C5, the player's actions (e.g., cards designated for discard), and the draw poker cards D1-D5. In some implementations, the table computer system 126 (in combination with a central computer system 128) can determine and manage gaming at each of the positions, and can simply use the devices 104-118 to present information to the players and to obtain player inputs (e.g., discard selections, bet amounts). In other implementations, each of the devices 104-118 can manage an individual player's gaming and can communicate with the table computer system 126 to receive card information. Other implementations are also possible.

The system 100 can additionally incorporate and permit remote players to play five-card draw poker on the table 102, such as through other computing equipment 136 and 138 (e.g., smartphones, tablet computers, wearable computing equipment (e.g., smart watches), desktop computers, laptop computers, media computers, virtual reality systems, augmented reality systems). For example, the system 100 can use the central computer system 128 to connect remote players with the table computer system 126 so that remote players can additionally participate in five-card draw poker gaming on the table 102. Such remote players may be located in the same facility as the table 102 (e.g., casino, card club, horse track) and/or remote from such a facility (e.g., located remotely, at home). Via the equipment 136 and 138, the remote players can connect to the computer system 128 and the table computer system 126 to participate in five-card draw poker gaming at the table 102 and/or other tables 130-132 over one or more networks 134, such as the internet, local area networks (LAN), wide area networks (WAN), virtual private networks (VPN), mobile data networks (e.g., 4G LTE networks), wireless networks (e.g., Wi-Fi networks, BLUETOOTH networks), and/or combinations thereof. The remote electronic equipment 136 and 138 can download and run code from the computer system 128 to provide electronic five-card draw poker gaming on the equipment 136 and 138 (e.g., provide user interfaces to establish/login to user accounts, to designate bet amounts, to present the initial poker hand C1-C5, to receive keep/discard action, to present the final hand based on the draw cards D1-D5, to determine gaming outcomes based on the final hand, and to allocate winnings to the player account). Such code can be, for example, a mobile application ("mobile app") that is downloaded and installed on the computing equipment 136 and 138, a browser-based application that is downloaded and run within a web browser application on the computing equipment 136 and 138, a standalone application that is downloaded and installed on the computing equipment 136 and 138, and/or other types of code and/or applications.

The computer system 128 can additionally allow players, such as local players using devices 104-118 and/or remote players using equipment 136-138, to bounce between gaming at tables 102 and 130-132, to play multiple hands simultaneously/concurrently across the tables 102 and/or 130-132, and to even combine common cards from multiple different tables 102 and 130-132 for a five-card draw poker hand. For example, a player can press a button requesting that the computer system 128 place him/her in the table that is going to be dealing next, so as to allow the player to minimize wait time. The computer system 128 can automatically transfer such a player to a table that is the first to scan a card in an initial poker hand, and can present the initial poker hand from that table to the player, even though the player may be located at another table or remote from the table. In a further example, a player may be permitted to concurrently play multiple hands across the tables 102 and/or 130-132. Additionally, the computer system 128 may perform load balancing of players so as to more evenly distribute players across the tables 102 and 130-132.

The computer system 128 can additionally distribute video, audio, and/or chat feeds for the tables 102 and 130-132 to remote players using the computing equipment 136-138.

Still referring to FIG. 1A, the dealer 124 can continuously deal sets of cards in step A. For example, as soon as at least one player joins a game, the dealer 124 can start to deal sets of cards and continue to deal sets of cards until all the players are done, the game has ended, or some input is received that indicates an end of gameplay. The dealer 124 can deal cards at a dealer-desired pace (e.g., as quickly as the dealer 124 can shuffle and deal sets of cards and/or at timed intervals, as described above). The dealt cards can be scanned by the scanner 122. Once scanned, the dealt cards are ready to be transmitted to any of the devices 104-118 and/or the other player computing equipment 136-138 when requested by the players. In some implementations, the dealer 124 may wait to deal sets of cards until a first player has joined a game. In some implementations, the dealer 124 may wait to deal sets of cards until one player provides first input at their devices 104-118 and/or computing equipment 136-138. The first input can, for example, be a discard action, a pause action, a resume action, a request for cards to build an initial hand, and/or a request for replacement cards. In yet some implementations, the dealer 124 can continuously deal sets of cards regardless of whether and/or when a player joins a game at the dealer 124's table 102.

Players can request sets of cards during gameplay in step B. Players can provide input at their devices 104-118 and/or computing equipment 136-138 that indicates that a new set of cards is needed (e.g., being requested) for that player. For example, a player can perform a discard action as input, which can be transmitted from the player's computing equipment to the table computer 126. Based on this discard action input, the table computer 126 can determine that the player needs one or more replacement cards.

As mentioned above, cards that are dealt are then scanned by the scanner 122. The table computer 126 can then transmit the sets of scanned cards to one or more of the devices 104-118 and/or player computing equipment 136-138 in step C. The sets of cards can be transmitted to the player computing equipment based on receiving user input from the players that indicates requests for new cards.

The table computer 126 can maintain each set of dealt cards with a respective timestamp indicating a time at which the set of cards were dealt and/or scanned by the scanner 122. When a request for cards or other input is received from one or more players, the table computer 126 can transmit a set of dealt cards having a timestamp that is most similar to (e.g., shortly after or shortly before) a timestamp of the request from the one or more players. In some implementations, the table computer 126 can transmit each set of dealt cards to each of the players' computing equipment (e.g., the devices 104-118 and/or the computing equipment 136-138) as they are dealt. The players' computing equipment can then determine which set of cards to present to the players based on a comparison of timestamps of each set of dealt cards with requests for cards from the players.

In some implementations, the table computer 126 can associate times at which physical cards are dealt with times at which such cards are scanned by the scanner 122 and registered by the table computer 126. This can be advantageous to recognize lag and/or relative timing to more accurately determine which sets of cards should be transmitted to which player computing equipment. As a result, players who are physically at the table 102 may not have advantages over online or remote players who cannot see the cards being physically dealt at the table 102. Moreover, online or remote players may not be able to take advantage of the time lag described above to know in advance what next cards will be registered and then transmitted to them.

FIG. 1B is another conceptual diagram of the example card-based electronic gaming system 100. Here, the table computer 126 may use prerecorded sequences of cards that are dealt into grid 127, which may be a virtual grid of cards. The shoe 120 can store one or more decks of physical playing cards that are randomly ordered within the shoe 120 through physical shuffling of the cards (e.g., machine shuffling, manual shuffling, or a combination thereof).

The size and shape (e.g., the number of columns and rows) for grid 127 may vary based on the type of game(s) being offered by system 100 and/or the number of players that can be supported by system 100. The dealer 124 may place each card as dealt from the shoe 120 into the grid 127 based on a particular pattern. For example, a first card may be placed in position A1, a second card may be placed in position A2, and so forth until the grid is filled. As an alternative example, the first card may be placed in position N5, the second card may be placed in position N4, and so forth until the grid is filled. Any number of patterns may be employed to fill the grid 127. The pattern can be switched by the dealer 124 after each grid is used to determine gaming outcomes or after a particular number of grids have dealt and used. The patterns used for card placement into the grid 127 may be rotated through based on a particular ordering of the patterns. Grid 127 may also be built virtually by the table computer 126 as the cards are dealt by the dealer 124 and read by the scanner 122, or based on a prerecorded dealt sequence of cards.

Through these collective parts (table 102, computing device 126, scanner 122, shoe 120, dealer 124, devices 104-118) the system 100 can provide dealer assist electronic gaming to players through the use of physical cards as dealt into grid 127, where the gaming outcomes are determined by the random ordering of physical playing cards within the shoe 120 instead of through a random or pseudo-random number generator.

The table computer 126 determines initial and next gaming outcomes for each player computer device 104-118 and remote computer devices/equipment 136-138 based on the cards in grid 127 for both card based and non-card based games. Examples of card based table games include, but are not limited to, Baccarat, Blackjack, Casino war, Faro, Poker and its variants, Red Dog, Teen Patti, and Trente et Quarante. Examples of non-card based table games include, but are not limited to, Chuck-a-luck, Craps, Pai Gow, Sic bo, Big Six wheel, Roulette, Fan-Tan, and Two-up. The table computer 126 may employ multiple grids to manage multiple games at the same time or to use one grid from which to select initial hands and another grid from which to select additional or replacement cards.

Similarly to the example in FIG. 1A, the table computer 126 is programmed to use common cards that are continuously dealt to provide electronic gaming to the players through the devices 104-118. For example, the table computer 126 can detect an initial hand of cards based on the cards dealt by the dealer 124 and their placement in grid 127. The table computer 126 can transmit information identifying the cards initial cards to the player devices being currently occupied by players (e.g., one, some, or all of the devices 104-118). Each of the occupied player devices, which can be any of a variety of computing device with an associated display (e.g., tablet computing device, embedded computing device), can present the initial hand to the players along with selectable options to discard some, none, or all of the initial cards. For example, the devices 104-118 can include touchscreens that present selectable buttons to discard or keep each of the initial cards. In another example, the devices 104-118 can include physical buttons corresponding to each of the initial cards through which the player can designate which cards to keep or discard. Additionally, multiple games/hands may be displayed by the devices 104-118 to a respective player. Player actions can be maintained locally on the devices 104-118 and/or can be transmitted to the table computer 126.

Once a player action is received, additional or replacement cards can be selected from cards in the grid 127 by the table computer 126 (e.g., via the scanner 122), wherein each of the cards in the grid 127 have been continuously dealt by the dealer 124. The selected cards can then be applied to the player whose action is received. As described in reference to FIG. 1A, this allows for each of the players to play the game at their desired pace without being slowed down or forced to wait for other players to make decisions in gameplay.

The dealer 124 may also deal a second grid 127 of cards from which the additional or replacement cards can be selected by the table computer 126. The second grid 127 may be dealt according to the same pattern as the first grid or a different pattern may be used. For example, A1 can be applied for the first card discarded from an initial hand, A2 can be applied for the second card discarded, A3 for the third, A4 for the fourth, and A5 for the fifth. So, if the player using device 104 decided to discard one card from the initial poker hand, then the discarded card can be replaced with A1. Similarly, if the player using device 106 decided to discard two cards from the initial poker hand, then the discarded cards can be replaced with A1 and A2, and so on. Alternatively, if the player using device 106 decided to discard two cards from the initial poker hand, then the discarded cards can be replaced with A2 and A3 (because A1 was provided to the first player), and so on.

The table computer 126 and/or the player devices 104-118 can determine the outcome of the game for each player based on the initial hand provided from grid 127, the player's actions (e.g., cards designated for discard), and the draw cards taken from grid 127 or from a second dealt grid. In some implementations, the table computer 126 (in combination with a central computer system 128) can determine and manage gaming at each of the positions, and can use the devices 104-118 to present information to the players and to obtain player inputs (e.g., discard selections, bet amounts). In the depicted example of FIG. 1B, the table computer 126 manages Games A-N for each of the devices 104-118 as well as remoted devices 136-138. In other implementations, each of the devices 104-118 can manage an individual player's gaming and can communicate with the table computer 126 to receive card information. Other implementations are also possible.

As described above in reference to FIG. 1A, each of the players at the devices 104-118 can receive sets of cards for each of the Games A-N based on times at which the players provide input indicating a need for a set of cards. The dealer 124 can continuously deal sets of cards that are scanned by the scanner 122. The table computer 126 can then receive requests for cards from any of the devices 104-118 and/or the computing equipment 136-138. The table computer 126 can transmit cards that were dealt at times that are the same or similar to the requests for any of the Games A-N that are played at the devices 104-118 and/or the computing equipment 136-138. Thus, continuous gameplay progression can exist for each of the players in each of their Games A-N. The players can continue to play their games at their desired paces without having to slow down or speed up gameplay to compensate for gameplay paces of other players at the table 102 and/or remote from the table 102.

Figure 1C:
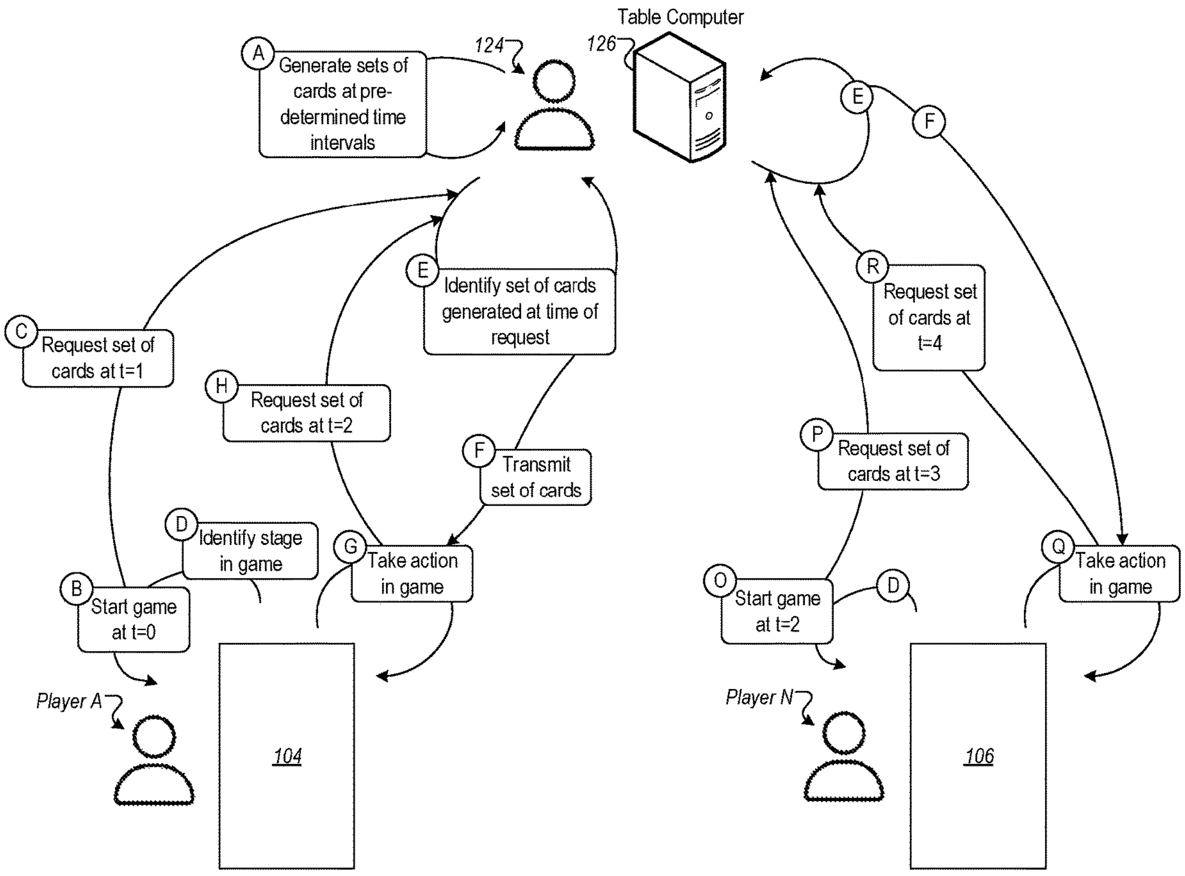
FIGS. 1C-F are conceptual diagrams of timing for example gameplay with the card-based electronic five-card draw poker gaming system of FIGS. 1A-B.

FIGS. 1C-F are conceptual diagrams of timing for example gameplay with the card-based electronic five-card draw poker gaming system of FIGS. 1A-B. In FIG. 1C, 2 players A and N are playing a game at player computer devices 104 and 106, respectively. The dealer 124 continuously generates sets of cards at predetermined time intervals in step A. As described with regards to FIGS. 1A-B, the dealer 124 can continuously deal sets of cards that are scanned by the scanner 122 and transmitted to the table computer 126.

With regards to player A, player A can start the game at time=0 in step B. The player A can start the game before or during a time at which the dealer 124 is dealing the sets of cards in step B. Starting the game can include the player A performing some action or providing some user input at the device 104 that indicates the player A is ready to play the game. For example, the player A can select an option at the device 104 to begin a new game, to resume a game, to select a game to play, or to take some action (e.g., request an initial hand of cards) in a game.

Player A can request a set of cards at time=1 in step C. The player A can, for example, select an option to receive a set of cards or otherwise build an initial hand of cards for the game. This user input can be transmitted to the table computer 126 in step C, thereby indicating the player A's request for a set of cards. The request can include a timestamp indicating a time at which the player A requests the set of cards. Sometimes, the timestamp can indicate the time at which the player A begins the game (e.g., t=0) instead of the time at which the request is transmitted to the table computer 126 (e.g., t=1).

Sometimes, time=1 can be the same time as time=0. For example, when the player A selects an option to begin a new game at the device 104, the device 104 can immediately/automatically transmit a request to the table computer 126 for a set of cards to build the player A's initial hand. Sometimes, time=1 can be the same, earlier, or later than a time at which the dealer 124 begins dealing cards or otherwise is currently dealing sets of cards in step A. Thus, the dealer 124 can already be dealing sets of cards at time=1. In other implementations, the dealer 124 may not begin to deal sets of cards until time=1, when the request for the set of cards is first received from the device 104 of the player A.

The device 104 can also identify what stage the player A is currently at in the game in step D. The device 104 can make this identification before, during, or after requesting the set of cards in step C. Moreover, sometimes, the device 104 can make this identification instead of the table computer 126 in order to more efficiently utilize computing resources and to avoid clogging resources of the table computer 126. An indication of the stage of gameplay can also be transmitted, by the device 104, to the table computer 126. The table computer 126 can use the stage of gameplay to determine what set of cards and/or how many cards to provide back to the device 104. The table computer 126 can also use the stage of gameplay to determine an order to fill in cards that are being replaced. Sometimes, if the table computer 126 transmits a full set of cards (e.g., 5 cards) to the device 104 in response to receiving the request for a set of cards in step C, the device 104 can determine, based on identification of the player A's stage of gameplay, how many and/or which cards to present to the player A as well as an order to fill in cards that are being replaced.

Accordingly, in step D, the device 104 can determine whether the player A is at an initial stage in which the player A receives a full set of 5 cards and/or may not be able to choose which cards are in their initial hand. The device 104 can also determine whether the player A is at discard stage in the game in which cards that are discarded may be replaced with new cards. Stage of gameplay can then be used to determine an order to fill in cards that need to be replaced in the player A's hand.

In step E, the table computer 126 can identify a set of cards that were generated (e.g., dealt by the dealer 124 and/or scanned by the scanner 122) at a time of the request (e.g., t=1). Sometimes, the table computer 126 can identify a set of cards that were generated within some predetermined time range from the time of the request, time=1. If, for example, a set of cards was generated at the same time as time=1, then the table computer 126 can identify that set of cards in step E. As another example, if a first set of cards was generated at a time that is several seconds before time=1 and a second set of cards was generated at a time that is several seconds after time=1, then the table computer 126 can identify the first set of cards. Identifying the second set of cards can be advantageous to ensure that no player has an upper hand or advantage over another player. The table computer 126 can transmit the identified set of cards to the device 104 in step F.

Sometimes, whenever sets of cards are generated in step A, the table computer 126 can transmit those sets of cards to the device 104. The device 104, instead of the table computer 126, can then identify which set of cards was generated at or near a time of the request for the set of cards in step E. This can be advantageous to reduce an amount of processing at the table computer 126. By offloading such processing to the device 104 and other player computer devices, the table computer 126 can more efficiently use its computational resources to make other determinations (e.g., determining gaming outcomes).

Still referring to FIG. 1C, once the device 104 receives the set of cards that were transmitted in step F, the device 104 can display the cards to the player A and the player A can take some action in the game based on the displayed cards (step G). For example, if the player A is starting the game and building an initial hand, the player A can select which of the displayed cards to keep and which to discard in step G. As another example, if the player A is at a stage in the game where the player A discarded cards from their hand, then new cards can merely replace the discarded cards in the player A's hand and the player A can continue with the gameplay (e.g., in which the player A can take some action in the game based on their hand that includes original cards and the new cards that replace the discarded cards).

Once the player A takes some action in the game in step G, the device 104 can transmit, to the table computer 126, another request for a set of cards at time=2 (step H). Steps C-H can repeat for so long as the player A is still playing the game. Time=2 can be any time later than time=1, which can depend on how quickly the player A paces their gameplay and/or makes decisions. For example, time=1, the first request for cards, can be merely seconds after the player A starts the game at time=0. However, time=2, the second request for cards, can be several minutes after the player A receives the set of cards generated at time=1 because the player A can take a longer time to make a decision and take an action in the game in step G. Regardless of how much time passes between requests and actions taken in the game, the dealer 124 is continuously dealing sets of cards in step A such that players at any stage of gameplay and/or pace of gameplay can continue to play their games at their desired paces and receive sets of cards that are generated around the same time as when the players request sets of cards.

Still referring to FIG. 1C, player N starts the game at time=2 (step O). In this example, player N starts the game at the same time as player A requests a second set of cards in step H. The player N can also start the game at any other time, including times that occur before, during, and/or after any of the steps B-H associated with player A.

The device 106 of the player N can then request a set of cards at time=3 in step P. Time=3 can be any time after time=2 and/or any other times described above. Time=3 can also be a same, earlier, and/or later time as any of the other times described above in reference to FIG. 1C. Sometimes, the request for a set of cards can be made at time=2, when the player N begins the game.

The device 106 can also identify the stage in the game of the player N (step D). The table computer 126 can identify a set of cards that were generated at the time of the request (step E). As described above, the table computer 126 can identify cards that were dealt at time=3, time=2, and/or any time within some predetermined range from time=3 or time=2. Sometimes, when the player N is starting the game, the table computer 126 can determine that the same cards that were transmitted to the device 104 of the player A to build player A's initial hand should also be sent to the device 106 of the player N. In such a scenario, the player N can receive the set of cards that were dealt at time=1 or time=0. The identified set of cards can then be transmitted from the table computer 126 to the device 106 (step F).

In an example where the device 106 requests a set of cards at time=2 instead of time=3 (in step P), the table computer 126 can determine that a same set of cards should be transmitted to the device 104 and the device 106 (e.g., since the device 104 requested a second set of cards at time=2 in step H), even if that set of cards is used as a replacement set for the device 104 and an initial hand for the device 106.

The player N can then take some action in the game at the device 106 (step Q). Based on the player N's action, the device 106 can transmit, to the table computer 126, another request for a set of cards at time=4 (step R). As described above in reference to the player A, the steps P, D, E, F, Q, and R can repeat for the player N for so long as the player N plays the game. Although the players A and N can be at different stages of gameplay, sometimes they can receive a same set of cards based on whether their devices 104 and 106 request sets of cards at same or similar times. There can also be scenarios in which the players A and N do not receive the same sets of cards at any times because the times at which their respective devices 104 and 106 request sets of cards are not within predetermined thresholds from each other and/or times at which the sets of cards are dealt (step A).

Figure 1D:
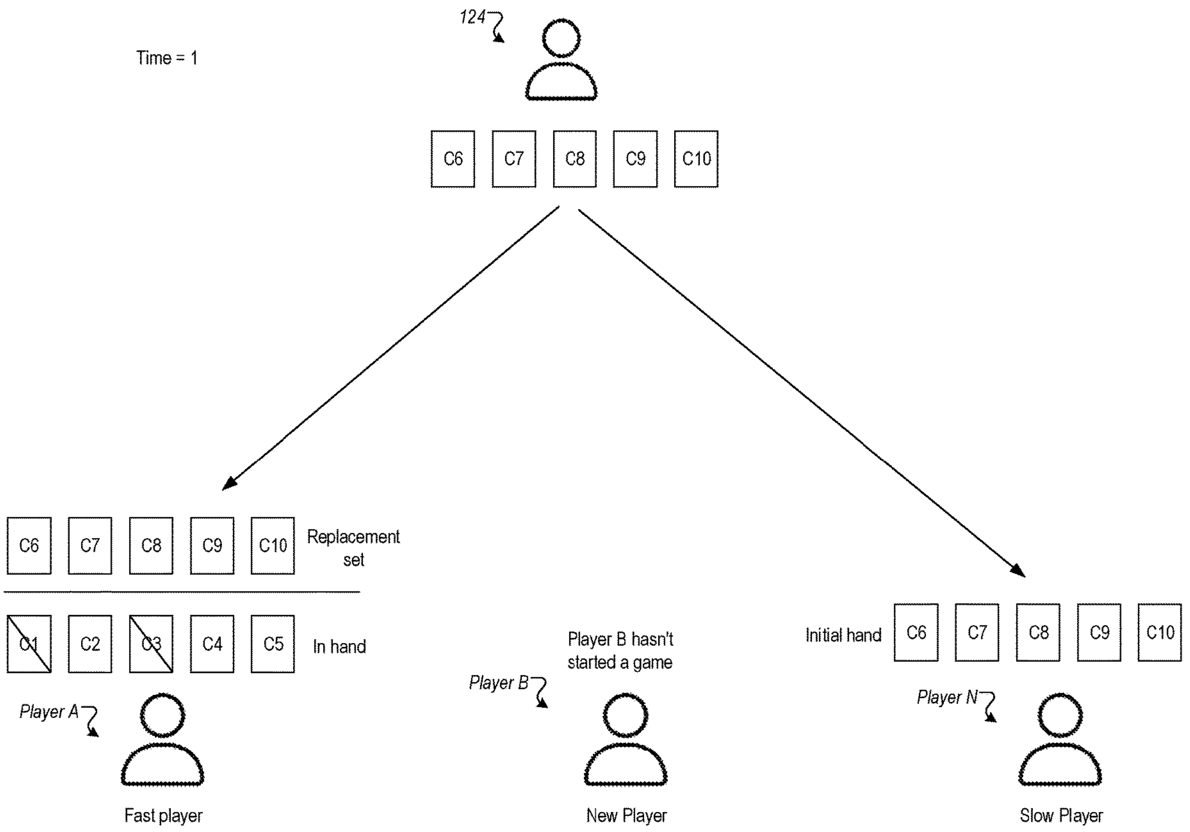

FIG. 1D depicts gameplay amongst players that play the game at different paces at time=1. Here, players A and N are currently playing the game. Player B has not yet started the game. Player A can be a fast player (e.g., a player playing faster than player N) and player N can be a slow player (e.g., a player playing slower than player A). Player A can have an initial hand that includes cards C1, C2, C3, C4, and C5. At time=1, player A can immediately perform a discard action and discard cards C1 and C3. At the same time=1, player N starts the game. Accordingly, player A receives a set of cards C6, C7, C8, C9, and C10 that were dealt by the dealer 124 at or around time=1 as a replacement set and player N receives the set of cards C6, C7, C8, C9, and C10 as an initial hand.

As shown in FIG. 1D, the cards that are dealt at time=1 are only transmitted to the players who are currently playing the game. Thus, the device of player B does not even receive the cards that are dealt at time=1. In some implementations, at time=1, although player B is not yet playing the game, the set of cards that are generated at time=1 can be transmitted to the player B's device, just not displayed to the player B. Thus, the cards that are generated at time=1 can be transmitted to devices of every player A, B, and N, regardless of whether the players A, B, and N are playing the game or taking some action in the game. Each device can then determine whether the respective player A, B, and N are playing the game, what stage of gameplay they are at, whether they have taken some action in the game, and whether to display the cards generated at time=1 to the player. In the gameplay scenario of FIG. 1D, the device of player B can determine that the player B is not playing the game and thus, the device may not display the cards that were generated at time=1 to the player B.

Figure 1E:
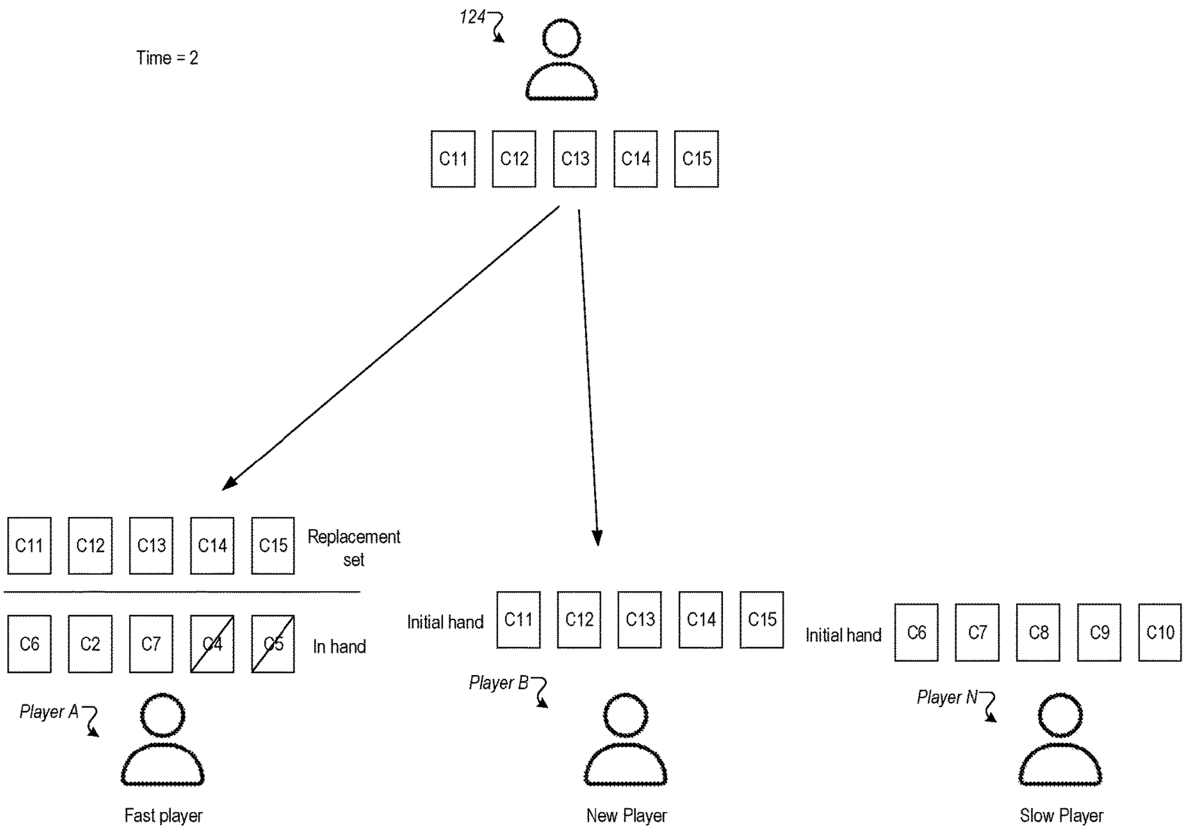

FIG. 1E depicts gameplay amongst players that play the game at different paces at time=2. At time=2, the dealer 124 has dealt cards C11, C12, C13, C14, and C15. Player A now has a hand that includes C6 (which replaced the discarded card C1 at time=1), C2, C7 (which replaced the discarded card C3 at time=1), C4, and C5. Player A quickly decides at time=2 to discard the cards C4 and C5. As a result, player A receives the cards C11, C12, C13, C14, and C15 as a replacement set. Player B has just started the game at time=2. Accordingly, player B receives the cards C11, C12, C13, C14, and C15 as their initial hand. Player N has still not taken some action in the game at time=2 and therefore still has the cards C6, C7, C8, C9, and C10 from time=1 as their initial hand.

Figure 1F:
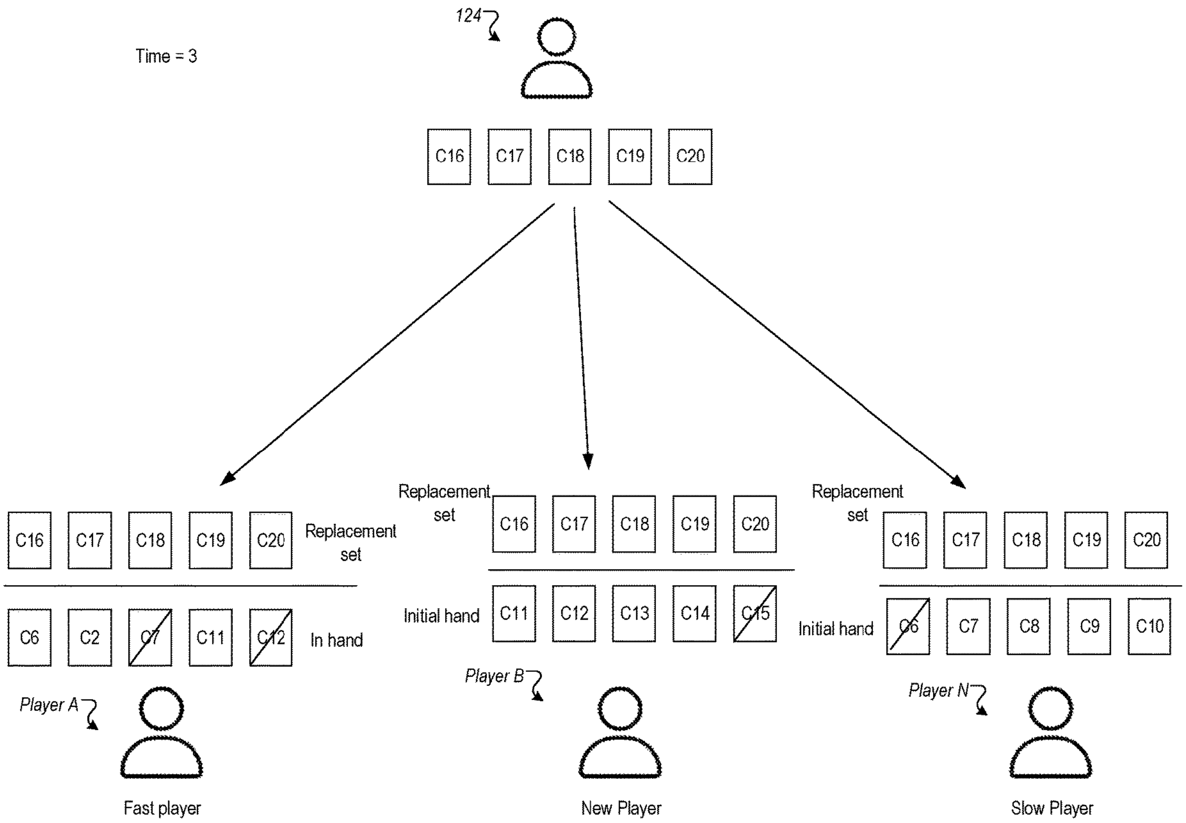

FIG. 1F depicts gameplay amongst players that play the game at different paces at time=3. At time=3, the dealer 124 has dealt cards C16, C17, C18, C19, and C20. Player A now has a hand that includes C6, C2, C7, C11 (which replaced the discarded card C4 at time=2), and C12 (which replaced the discarded card C5 at time=2). Again, player A quickly decides at time=3 to discard the cards C7 and C12. As a result, player A receives the cards C16, C17, C18, C19, and C20 as a replacement set. At time=3, player B has decided to discard card C15 from their initial hand. Accordingly, player B also receives the cards C16, C17, C18, C19, and C20 as a replacement set. Player N has finally decided to take some action in the game, which includes discarding card C6 from their initial hand. Hence, Player N also receives the cards C16, C17, C18, C19, and C20 as a replacement set.

Gameplay can continue amongst the players A, B, and N. For example, in player A's hand, card C7 can be replaced by C16 and card C12 can be replaced by C17. In player B's hand, card C15 can be replaced by C16. In player N's hand, card C6 can be replaced by C16. One or more other orders to fill in cards that are being replaced can be used, as described further below. As shown in FIGS. 1D-F, fast players, such as the player A, can receive the sets of cards that were generated at time=1, time=2, and time=3. Thus, such fast players do not have to stall or pause their gameplay to wait for slower players, such as player N. Some players, such as player N, may only receive some sets of cards that were generated at time=1, time=2, and time=3 because they play at a relatively slower pace. Thus, player N only received the sets of cards that were generated at time=1 and time=3. Player N played slow enough that too much time had passed where the player N took some action between time=1 and time=3.

Figure 2A:
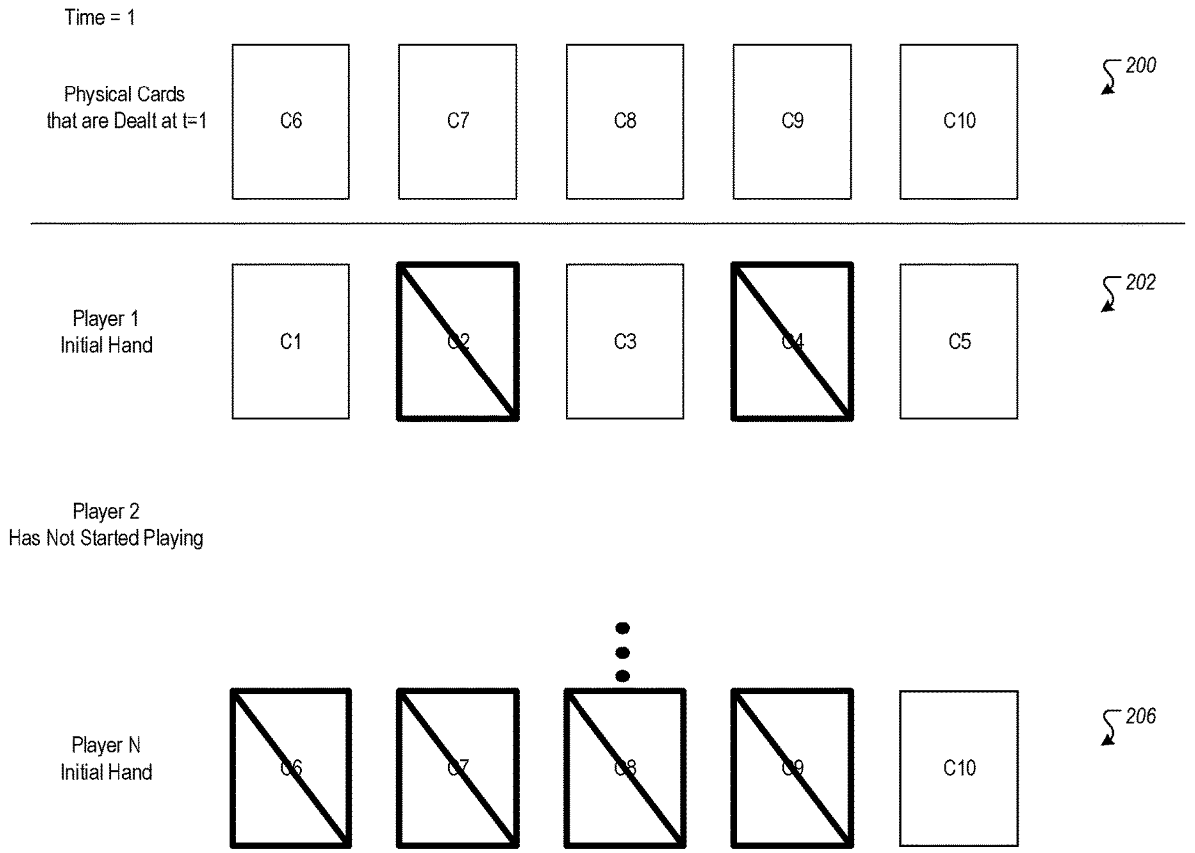
FIGS. 2A-C depict example game play using cards that are continuously dealt with an example card-based electronic five-card draw poker gaming system.
Figure 2B:
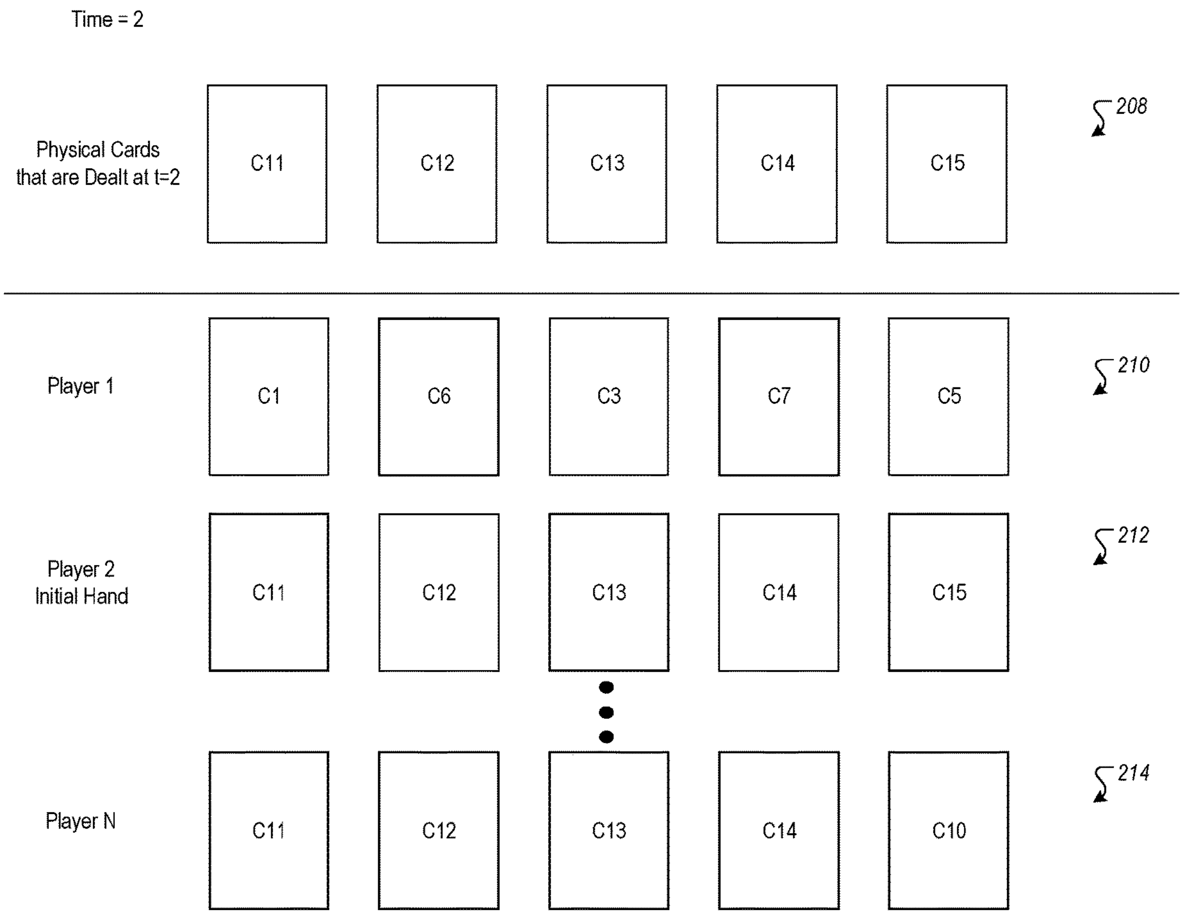
Figure 2C:
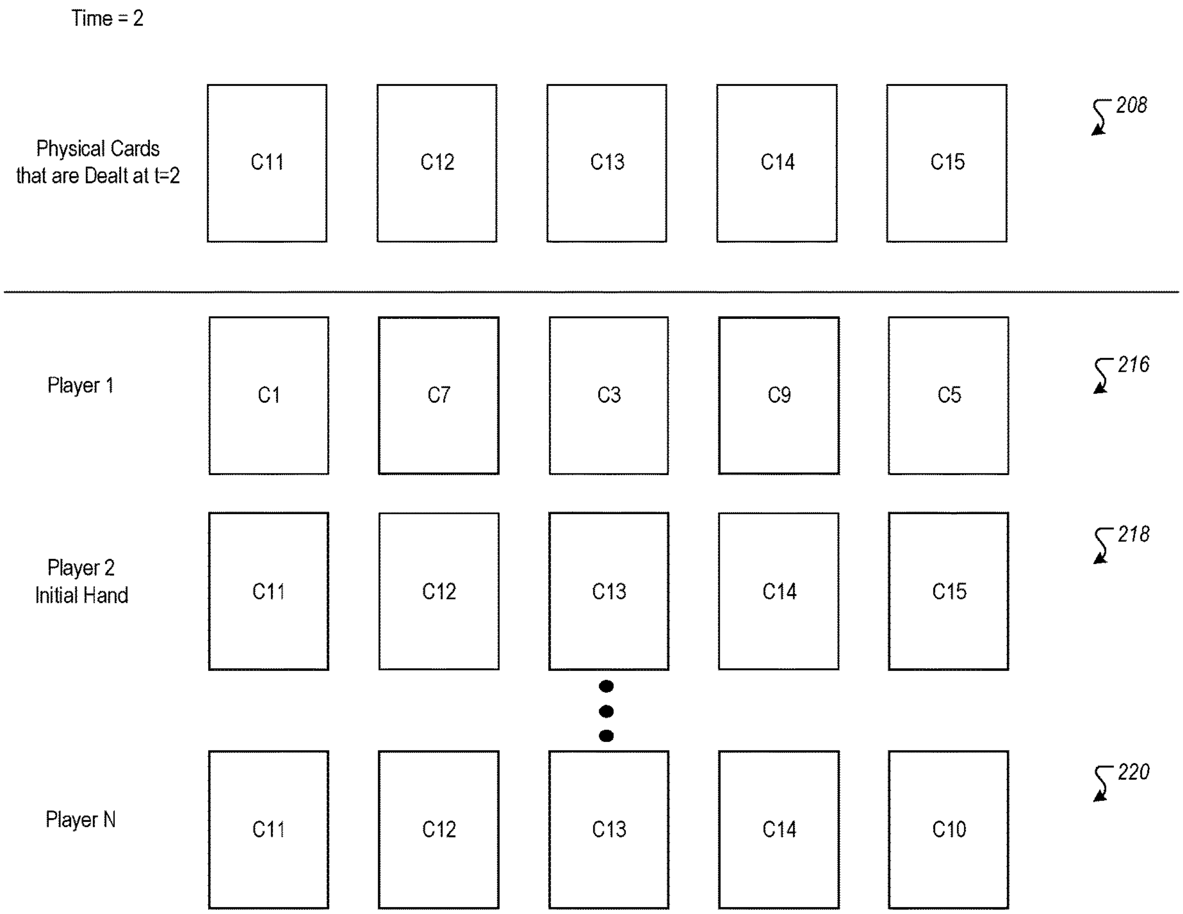

FIGS. 2A-C depict example game play using cards that are continuously dealt with an example card-based electronic five-card draw poker gaming system. As shown in FIG. 2A, physical cards hand 200 that are dealt by a dealer (e.g., dealer 124) at time=1 are presented above the line. Cards that are presented to example players 1-N on computing equipment, such as devices 104-118 and 136-138, are presented below the line. FIG. 2A presents the initial five-card draw poker hands that are dealt to the players 1-N as well as the example actions that each of the players 1-N take with regard to their respective hands.

For example, at time=1, the dealer deals the hand 200, which includes cards C6, C7, C8, C9, and C10. At time=1, player 1 has an initial hand 202 that includes cards that were dealt before time=1. Thus, the player 1's initial hand 202 includes cards C1, C2, C3, C4, and C5. At this time, player 1 has also taken an action that includes discarding cards C2 and C4. Player 2 has not yet started playing the game, and therefore does not have an initial hand. Player N, however, has just started the game at time=1. Thus, the dealt hand 200 has become player N's initial hand 206. Player N's initial hand 206 therefore includes cards C6, C7, C8, C9, and C10. At time=1, however, the player N has taken an action that includes discarding cards C6, C7, C8, and C9.

The cards that are discarded from the hands 202 and 206 can be replaced in different orders, as depicted and described in reference to FIGS. 2B and 2C.

Referring now to FIG. 2B, cards in the players 1-N's hands can be replaced based on an order in which the cards are drawn by the dealer. Thus, a first draw card can be provided in place of a first discard from a player's poker hand, a second draw card can be provided in place of a second discard, a third draw card can be provided in place of a third discard, a fourth draw card can be provided in place of a fourth discard, and a fifth draw card can be provided in place of a fifth discard.

For example, although player 1 discarded their second and fourth cards (C2 and C4), these cards can be replaced by the first and second cards that are drawn in the dealt hand 200 from time=1. Thus, player 1's new hand 210 includes cards C1, C6, C3, C7, and C5. At time=2, the dealer dealt a new set of cards 208, which include C11, C12, C13, C14, and C15. Player 2 has begun the game at time=2, so player 2's initial hand 212 can include all the cards C11, C12, C13, C14, and C15 in the order in which they were dealt. Player N had decided, at time=1, to discard cards C6, C7, C8, and C9 from their hand 206. Thus, at time=3, player N's new hand 214 includes cards C11, C12, C13, C14, and C10, where cards C11, C12, C13, and C14 replace the original cards C6, C7, C8, and C9 in the order in which they were dealt.

Referring now to FIG. 2C, cards in the players 1-N's hands can be replaced based on positions of the cards that are discarded from a player's hand. For instance, a first draw card can be provided in place of a card that is discarded from a first position in a player's hand. A second draw card can be provided in place of a card that is discarded from a second position in the player's hand, a third draw card can be provided in place of a card that is discarded from a third position in the player's hand, a fourth draw card can be provided in place of a card that is discarded from a fourth position in the player's hand, and a fifth draw card can be provided in place of a card that is discarded from a fifth position in the player's hand.

In the example of FIG. 2C, the player 1 discarded card C2 in a second position and C4 in a fourth position in their hand 202. Thus, in the player 1's new hand 216, C2 in the second position has been replaced with card C7, which was the second card drawn in the hand 200 at time=1. Similarly, C4 in the fourth position has been replaced with C9, which was the fourth card drawn in the hand 200 at time=1. Player 2 started the game at time=2, so player 2's initial hand 218 includes the cards C11, C12, C13, C14, and C15 in the order in which they were drawn/dealt at time=2. Player N's new hand 220 has cards C11, C12, C13, and C14 in the positions in which they were drawn at time=2 to replace the cards C6, C7, C8, and C9. Card C10 remains in the fifth position in the player N's hand 220 since the player N has kept that card from their initial hand 206.

An outcome for the example hands depicted in FIGS. 2B and 2C with each of the players 1-N can be determined based on the final poker hands 210-214 or 216-220, respectively. For example, a player with a pair may receive a 1:1 payout, a player with two pairs may receive a 3:2 payout, and a player with a royal flush may receive a 100:1 payout. Odds and outcomes can vary and can be determined using payout tables that correlate a hierarchy of poker hands to different payout odds. For example, the devices 104-118 and 136-138 can permit players to select a type of five-card draw poker game (e.g., Jacks or Better, Tens or Better, Deuces Wild, Bonus Poker, Double Bonus Poker) that they are playing, which can each have different payout tables that provide different odds for different types of hands. In addition to having different gaming outcomes based on the cards that players decide to discard from their initial hand and times at which players request new sets of cards relative to each other and times at which the cards are dealt, a variety of other factors can additionally determine the outcome for the player and the payout odds, such as the type of game that a player selects to play, the bet amount relative to the minimum bet denomination (e.g., max bet amount for a game can have greater odds than the minimum bet amount), the location at which the game is being played (e.g., game in bar can use payout table with different odds than standalone gaming equipment/table on floor of race track), the type of equipment on which the game is being played (e.g., standalone gaming equipment/table can have greater odds than gaming provided on mobile computing equipment), whether the game is part of a progressive jackpot pool (e.g., electronic touchscreens part of a progressive pool that builds over time until a player gets a particular type of hand(s) can have different odds than electronic touchscreens that are not part of a progressive pool), and/or other factors.

For instance, under a Deuces Wild game, the player may not win the hand unless he/she attains a hand of three of a kind or better (with deuces being wildcards), whereas with the Jacks or Better game, the player may win the hand when he/she attains a pair of jacks or better—the payout table for these games correlates different hands within the hierarchy of poker hands to different outcomes and odds. The gaming outcome for players, and in particular the payout ratio, can depend on a bet amount and/or the location at which the game is being played (e.g., local at the table can have the highest payout, remote location within the gaming facility can have next highest payout, and remote connection outside the gaming facility can have lowest payout—other schemes are also possible). For example, many five-card draw poker games can permit a player to bet in increments of a minimum bet amount (e.g., $0.05/hand) up to a maximum bet (e.g., 5× maximum bet for maximum of $0.25/hand). However, the payout for some maximum bets (e.g., 5× bet) can be greater than the multiplier for the maximum bet. For instance, a royal flush may payout at 300:1 for a 1× bet of the minimum bet amount, whereas a royal flush may payout at 3000:1 for a 5× bet of the minimum bet amount, which is a 10× multiplier of the payout for a 5× multiplier of the bet amount. The devices 104-118 and 136-138, the table computer 126, and/or the computer system 128 can be programmed to provide electronic five-card draw poker gaming outcomes to the players 1-N based on the initial poker hands, the player discard actions, the continuously dealt sets of cards, the poker game selected by each player, the pace at which each player plays the poker game, the stage of gameplay of each player, and the bet amounts placed by each player.

The devices 104-118 and 136-138 can be part of a pool of gaming systems that provide progressive jackpots, which are jackpots that build over time until a player gets a particular hand (e.g., royal flush, straight flush). For example, the devices 104-118 can be part of the same progressive pool that builds over time until a player at one of those devices 104-118 gets a particular hand that wins the progressive jackpot, such as obtaining a royal flush. There can be multiple different progressive pools across different groups of gaming systems.

Figure 3:
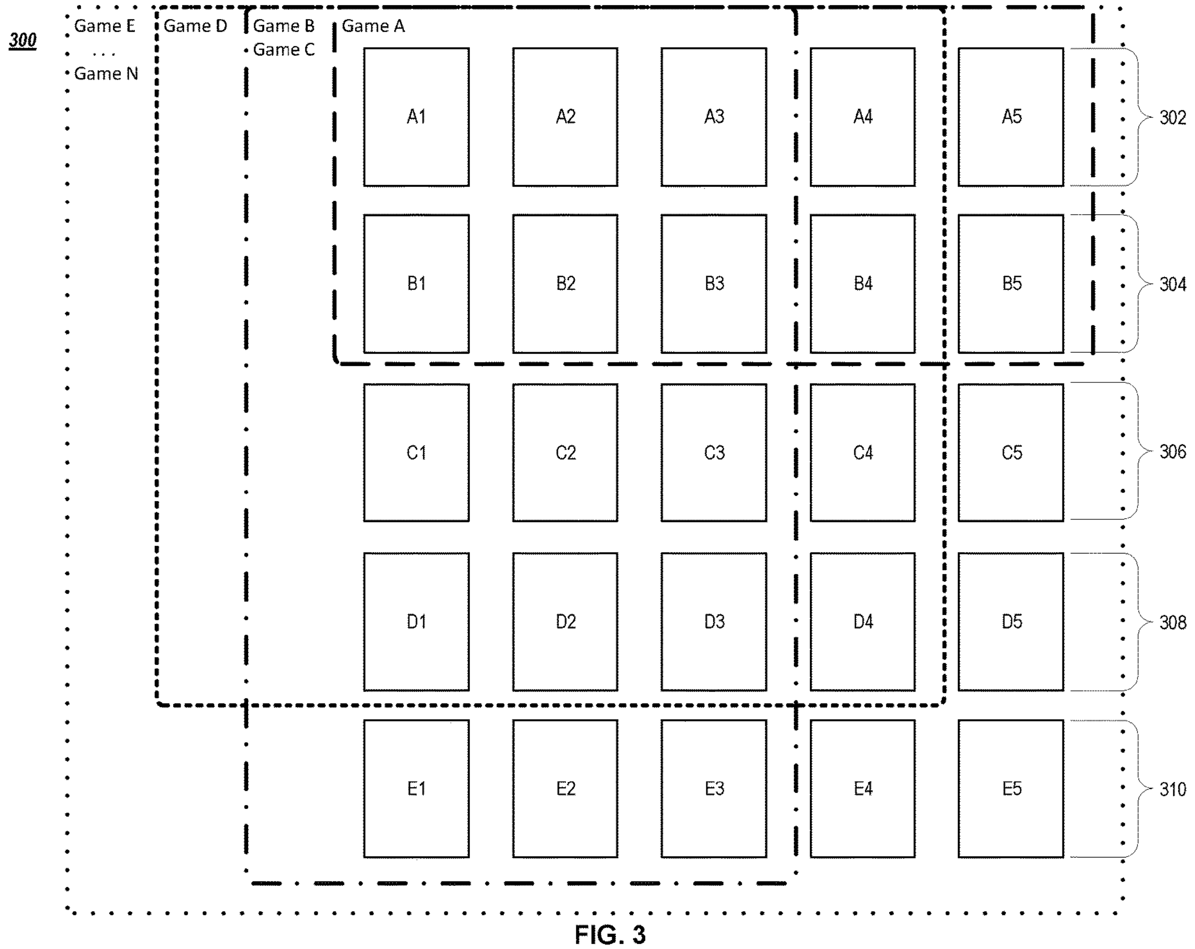
FIG. 3 depicts an example grid of continuously dealt playing cards.

FIG. 3 depicts an example grid 300 of continuously dealt playing cards. Depicted in FIG. 3 are various example predefined areas, Games A-N, of the grid 300. Physical cards are dealt by a dealer (e.g., dealer 124) into grid 300, which are then used by an electronic table computing device, such as table computer 126. In some implementations, grid 300 is constructed based on a sequence of previously dealt and recorded cards. Each of the predefined areas of grid 300 may be used by the table computer 126 for a particular type of game, Game A, Game B, and so forth, for which the table computer 126 provides gaming outcomes. Moreover, the cards in the grid 300 can be continuously shuffled and/or dealt, as described herein. Sometimes, all of the cards in the grid 300 can be shuffled (all 25 cards). Sets of cards can then be determined along different rows, horizontals, cross-crosses, etc. of the grid 300. This can allow for multiple games to be played in a same screen or interface (e.g., each row can represent a different game that can be played at a same time). Once the cards are shuffled, sets of the shuffled cards can then be transmitted to player devices of the players as described in reference to FIGS. 1A-F and 2A-C. Sometimes, fewer than all 5 sets depicted in the grid 300 can be continuously shuffled and used to generate new sets of cards.

As depicted in FIG. 3, grid 300 includes cards A1-5 in row 302, B1-5 in row 304, C1-5 in row 306, D1-5 in row 308, and E1-5 in row 310. Grid 300 is depicted as including five rows, rows 302-310, and five columns; however, any combination of rows and columns may be employed by the system to determine gaming outcomes.

In the depicted example, the table computer 126 uses cards A1-5 and B1-5 for Game A. The table computer 126 can select cards for gameplay based on card position in the grid 300. The cards A1-5 and B1-5 can also be continuously shuffled for the Game A. A player may be assigned a starting position in the grid 300 or section of the grid assigned to the particular game from which the table computer 126 may select cards. The table computer 126 may select cards sequentially or based on a step sequence (e.g., every other card) from the grid 300, starting from the starting position or based on a draw order assigned to the player or player's hand. For example, A1 may be the starting position and a step sequence of every other card being selected (e.g., A3 would be the second card selected, A5 would be the third cards selected, B2 would be the fourth card selected, and so forth). Other possible algorithms may be used to determine the initial hand and draw cards from the grid 300 for the particular game.

Once cards for each initial hand are determined, for example cards A1-5, the hands may be presented as initial virtual hands to players on computing devices, such as the devices 104-118 and/or remote devices 136-138 (e.g., in a five-card poker game). The devices may record a respective player's action, such as a discard selection(s). The table computer 126 may then use cards B1-5 to replace discarded cards for players at a first time (e.g., the table computer 126 provides a replacement card based on the position of the discarded card in the respective player's hand). The table computer 126 can also reshuffle and/or deal any of the cards in the rows 302-310 and use those cards to replace discarded cards for players at one or more different times.

As an illustrative example, the table computer 126 may replace A2 from a player's hand when discarded during a player's action with card B2, where card B2 was generated in the row 304 at a same or similar time as the player discarded card A2. Alternatively, the table computer 126 may provide a replacement card based on the sequential order of the row. For example, B1 would replace the first card discarded during a player action regardless of the position of the discarded card and so forth. In another alternative implementation, the table computer 126 can use a draw order for the draw cards that is assigned to each player. In a similar manner, the table computer 126 may use each predefined section of grid 300 (e.g., Games A-N) and a draw order, which may be updated between games and/or a series of games, for each predefined section to provide gaming outcomes to the player devices for each type of game supported by the table computer 126.

As an example, assuming that Game A is five-card draw poker, an outcome for each player is determined based on the final five cards in each player's hand, which, as indicated above, may be based on the Game A section of grid 300, different sets of cards that are continuously shuffled in any of the Game A-N sections of the grid 300, a draw order, each player's action, and/or timing of each player's action. In this example, a player with a pair may receive a 1:1 payout, a player with two pairs may receive a 3:2 payout, and a player with a royal flush may receive a 100:1 payout. Odds and outcomes can vary and can be determined using payout tables that correlate a hierarchy of poker hands to different payout odds. For example, the devices 104-118 and 136-138 can permit players to select a type of five-card draw poker game (e.g., Jacks or Better, Tens or Better, Deuces Wild, Bonus Poker, Double Bonus Poker) that they are playing, which can each have different payout tables that provide different odds for different types of hands. In addition to having different gaming outcomes based on the cards that players decide to discard from their initial hand, a variety of other factors can additionally determine the outcome for the player and the payout odds, such as the type of game that a player selects to play, the bet amount relative to the minimum bet denomination (e.g., max bet amount for a game can have greater odds than the minimum bet amount), the location at which the game is being played (e.g., game in bar can use payout table with different odds than standalone gaming device/table on floor of casino), the type of device on which the game is being played (e.g., standalone gaming device/table can have greater odds than gaming provided on mobile device), whether the game is part of a progressive jackpot pool (e.g., gaming devices part of a progressive pool that builds overtime until a player gets a particular type of hand(s) can have different odds than gaming devices that are not part of a progressive pool), and/or other factors.

For instance, under a Deuces Wild game, the player may not win the hand unless he/she attains a hand of three of a kind or better (with deuces being wildcards), whereas with the Jacks or Better game, the player may win the hand when he/she attains a pair of jacks or better—the payout table for these games correlates different hands within the hierarchy of poker hands to different outcomes and odds. The gaming outcome for players, and in particular the payout ratio, can depend on a bet amount and/or the location at which the game is being played (e.g., local at the table can have the highest payout, remote location within the gaming facility can have next highest payout, and remote connection outside the gaming facility can have lowest payout—other schemes are also possible). For example, many electronic games can permit a player to bet in increments of a minimum bet amount (e.g., $0.05/hand) up to a maximum bet (e.g., 5× maximum bet for maximum of $0.25/hand). However, the payout for some maximum bets (e.g., 5× bet) can be greater than the multiplier for the maximum bet. For instance, a royal flush may payout at 300:1 for a 1× bet of the minimum bet amount, whereas a royal flush may payout at 3000:1 for a 5× bet of the minimum bet amount, which is a 10× multiplier of the payout for a 5× multiplier of the bet amount.

The devices 104-118 and 136-138, the table computer 126, and/or the computer system 128 can be programmed to provide electronic gaming outcomes to the players based on the cards in grid 300 that are continuously shuffled/dealt; the predefined section of the grid 300 mapped to the current game (e.g., Games A-N), a selection algorithm that determines the initial poker hands and draw cards based on, for example, a draw order; the player discard actions; the poker game selected by each player; and the bet amounts placed by each player. For instance, referring to the example grid 300 depicted in FIG. 3, the selection algorithm for a poker game may designate one of the rows of cards (e.g., row 302 with cards A1-A5) as the initial hand that provided to each player, and from which players can individually select discards. Once players have entered their discard actions, the remaining rows of cards can be dealt (e.g., deal rows 302-310) based on times at which each of the players enter their discard actions. For example, players who discard cards at time=1 can receive cards from the row 304 as replacement cards, players who discard cards at time=2 can receive cards from the row 306, players who discard cards at time=3 can receive cards from the row 308, and players who discard cards at time=4 can receive cards from the row 310. One or more other arrangements for providing cards to the players are possible.

The selection algorithm can use any of a variety of techniques to allocate draw cards from the remaining rows for each of the players, which provide for variation in which draw cards are allocated to each of the players. For example, the selection algorithm can assign different draw orders across some or all of the cards in the remaining rows to the players, such as assigning different orderings of cards within the same row (e.g., each player assigned different order of cards B1-B5 for row 304), assigning different rows of cards to each player (e.g., each player assigned one of rows 304-310), assigning different orderings of cards across different rows (e.g., each player assigned different order of cards B1-E5 for rows 304-310), and/or combinations thereof. The assignments can be automatically determined by the system and/or based on user input/selection. For instance, if the row 302 (cards A1-A5) is used to provide the initial hand, each player may be given the option to select one of the rows 304-310 (example of four remaining rows is depicted, but other numbers of rows from which players can select may be provided—such as two rows, three rows, five rows, etc.) to provide the draw order for the player. The selected row 304-310 for each player may then be (1) continuously shuffled, (2) continuously dealt, and/or (3) used to replace discards for each player using any of a variety of appropriate techniques, such as starting with a first card in the selected row and proceeding sequentially through the row (e.g., replace first discard with B1, next discard with B2, and so on), replacing each discard with a corresponding positioned card within the selected discard row (e.g., replace discard A2 with corresponding card B2 in selected row 304, replace discard A5 with corresponding card A5 in selected row 304), and/or combinations thereof. Other techniques and processes for selecting cards to replace discards are also possible.

The devices 104-118 and 136-138 can be part of a pool of gaming devices that provide progressive jackpots, which are jackpots that build over time until a player gets a particular hand (e.g., royal flush, straight flush). For example, the devices 104-118 can be part of the same progressive pool that builds over time until a player at one of those devices 104-118 gets a particular hand that wins the progressive jackpot, such as obtaining a royal flush. There can be multiple different progressive pools across different groups of gaming devices.

Figure 4:
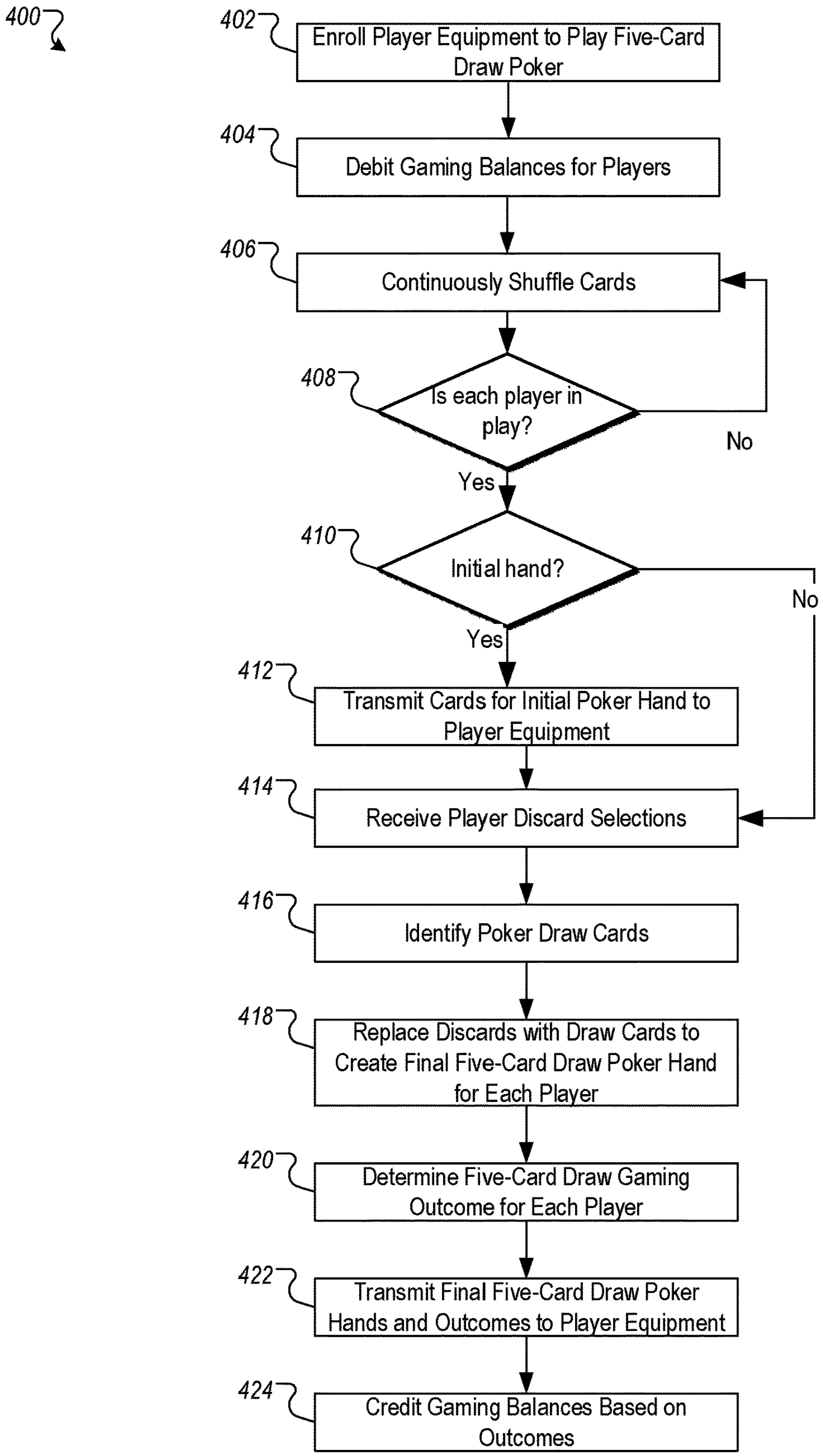
FIG. 4 is a flowchart of an example technique for performing card-based electronic five-card draw poker gaming.

FIG. 4 is a flowchart of an example technique 400 for performing card-based electronic five-card draw poker gaming. The example technique 400 can be performed by any of a variety of appropriate computing equipment and/or systems, such as the table computer 126, the player computing devices 104-118 and 136-138, and the computer system 128.

Player computing devices/equipment that are going to play a five-card draw poker game can be enrolled (402) and debits for playing the game can be taken against gaming balances for each of the players (404). For example, the devices 104-118 and 136-138 can enroll with the table computer 126 and/or the computer system 128 to play in a next hand of five-card draw poker on the table 102, and a debit/ante to play the game can be taken from each player's virtual gaming balance that is maintained on devices 104-118 and 136-138, the table computer 126, and/or the computer system 128. The players can be enrolled at different times, based on whenever each of the new players desire to join or start the game.

Enrolling a new player can include, for example, the player either creating or providing player account information via the devices 104-118 and 136-138. For example, a new player may create a new player account by physically and/or electronically depositing money via the devices 104-118 and 136-138, the table computer 126, and/or the computer system 128 (e.g., feeding physical money into a bill reader that is part of/connected to the devices 104-118, providing credit/debit card information, providing bank account information). A unique account identifier can be created and funds deposited into the account can be credited to the account by the table computer 126 and/or the computer system 128, for example, as part of a ticket-in ticket-out (TITO) system. Players with preexisting accounts can provide account information via the devices 104-118 and 136-138 through one or more input mechanisms, such as through a physical ticket reader (e.g., ticket reader to read unique account identifier encoded on the ticket), through a player card reader (e.g., magnetic strip reader, RFID reader), through input of a username and password, and/or through other input mechanisms. New players can be prompted through one or more selectable options to designate a type of poker game they want to play and/or to designate a bet amount for the next five-card draw poker hand.

Enrolling existing players can include receiving input from the players at any point during the game. The time at which the player provides input to start a game can be used to determine which initial hand the player receives. Therefore, the game can have continuous progression and players that are currently playing or wanting to start the game do not need to wait for other players to make a decision or otherwise opt in to join the game.

In some implementations, however, enrolling existing players in a next five-card draw poker hand can include players either providing or not providing particular types of input within a threshold amount of time for the next hand to start. For example, in some instances players may opt-in to play a next hand, and can be provided with a time-limited selectable option to opt-in to game play for a next five-card draw poker hand at a table where the player just finished a hand. Failure to select the option within a threshold amount of time can cause the player to sit-out the next hand. In other instances, player may have to opt-out to avoid repeating his/her bet in a next hand, and can be provided with a time-limited selectable option to opt-out of game play for the next five-card draw poker hand at a table. Failure to select the option within the threshold amount of time can cause the player to be automatically enrolled in the next hand at the same bet amount. Other opt-in and opt-out options are also possible, such as a player designating a bet amount for a next five-card draw poker hand as an implicit opt-in for a next five-card draw poker hand. Existing players can additionally be provided with selectable options between hands to change the type of game that they are playing between and/or to change their bet amount.

Physical cards that are going to be continuously shuffled and dealt across the players and their equipment as the initial poker hand for each player can be detected (406). As described above, the dealer can continuously shuffle cards for a duration of gameplay. The cards can be shuffled into sets, which are scanned and can be provided to the player devices 104-118 and 136-138 when the player requests a set of cards. The table computer 126 can detect five cards (e.g., cards C1-05) that are physically dealt by a dealer from the shoe 120 as an initial poker hand at a first time using the scanner 122. The scanner 122 can therefore identify each of the physical cards as they are dealt by the dealer at a gaming table.

The table computer 126 can then determine whether each player is currently in play (408). The table computer 126 can receive input from the devices 104-118 and 136-138 of the players indicating that the player has joined the game, enrolled, and/or gaming balances have been removed from the players. The table computer 126 can also receive input from the devices 104-118 and 136-138 indicating a request for cards (e.g., an initial hand, a replacement set). The table computer 126 can also determine whether each player is in play based on how much time has passed since the player last provided input or took some action in the game. If, for example, the player's last action was taken during a window of time that exceeds some threshold range (e.g., 10 minutes), then the table computer 126 can determine that the player is not currently in play. The player may, for example, have stepped away from their device 104-118 and 316-138 to do some other activity (e.g., get food, go to the restroom, or altogether stop playing the game).

If the table computer 126 determines that none of the players are in play (408), then the table computer 126 can merely continue to detect shuffled/dealt sets of cards (406). If at least one player is in play (408), then the table computer 126 can determine whether the player is starting a game and requires an initial hand (410). This determination can be made based on information that is received from the devices 104-118 and 136-138. For example, each of the devices 104-118 and 136-138 can determine a stage of gameplay of each player (e.g., refer to FIG. 1C). The devices 104-118 and 136-138 can transmit the determined stage of gameplay to the table computer 126, which the table computer 126 can use in 410 to determine whether the player is requesting an initial hand. As a result, computational resources can be more efficiently used at the table computer 126 by offloading the stage determination processing to the individual player computing devices 104-118 and 136-138. In other implementations, the table computer 126, the computer system 128, or other suitable computer(s) can determine the stage of gameplay of each player.

If the player requests an initial hand (410), then information identifying the cards for the initial poker hand at the first time can be transmitted to the player device(s) 104-118 and 136-138 that enrolled in the game at or around the first time (412). If the player did not request an initial hand, then the table computer 126 can proceed to 414, which is discussed below.

In 412, the table computer 126 can transmit information identifying the cards C1-C5 in the initial poker hand of the first time to the device(s) 104-118 and 136-138, which can present the cards on the displays to the players along with selectable options through which the players can designate which cards they will hold and which cards they will discard. Players that start the game at or around the same time can each receive and be presented with the same initial poker hand, but can make individual game decisions so far as which cards are held and which cards are discarded. The players can also continue to play the game at their desired paces, and therefore may receive subsequent sets of cards that are generated at different times. Players can employ different gameplay strategies, which may be dictated in part based on the type of poker game that each player has elected to play (e.g., some five-card poker games payout for a pair of cards whereas others only begin paying out with three of a kind) as well as the bet amount that each player has placed for the hand (e.g., some outcomes can pay at increased multipliers for higher bet amounts). Their gameplay strategies can influence how quickly they play the game and which sets of cards they receive, without impacting a gameplay speed of other players.

For example, the table computer 126 can continuously identify candidate sets of physical playing cards that are dealt by the dealer and scanned by the scanner. The table computer 126 can receive a first request for cards from a first player computing device. The table computer 126 can receive a second request for cards from a second player computing device. The table computer 126 can then identify, among the candidate sets of physical playing cards, a first set of the cards in response to the first request from the first device. For example, the first request can include a first time stamp and the table computer 126 can identify the first set of cards that has been dealt by the dealer or detected by the scanner at or immediately before the first timestamp. Sometimes, the table computer 126 can identify the first set of cards that has been dealt by the dealer or detected by the scanner within some time range after the first timestamp.

The table computer 126 can also identify, among the candidate sets of physical playing cards, a second set of the cards in response to the second request from the second device. As mentioned above with regards to the first request, the second request can include a second timestamp, and the table computer 126 can identify the second set of cards that were dealt by the dealer or detected by the scanner at, immediately before, or immediately after the second timestamp. Sometimes, both the first and second requests can have same or similar timestamps. Accordingly, the table computer 126 can identify a same set of cards to transmit to both the first and second devices. Although the same set of cards can be transmitted to both devices, the set of cards can be used as an initial hand for one of the devices and a replacement set of cards for the other device.

Data representative of the first set of cards (e.g., card values) can be transmitted to the first device and data representative of the second set of cards can be transmitted to the second device. As described throughout, the first request and the second request can be received at different times. Sometimes, the first request can be generated at the first device at a different time than a time that the second request is generated at the second device.

The players can provide their hold/discard selections for the initial poker hand to the computing devices 104-118 and 136-138, which can then be transmitted to and received by the table computer 126 (414). If a player is in play but does not need an initial hand, then the player can provide their hold/discard selections for their current hand in 414. Discard selections can be received at the devices 104-118 and 136-138, and transmitted to the table computer 126.

Additional physical draw cards that are shuffled and dealt at or around a time at which the player discard selections are received can be identified (416). Sometimes, the table computer 126 can identify the additional physical draw cards that are dealt at the time at which the player makes the discard selection. This timing can be advantageous to compensate for potential lag time between transmitting information amongst the devices 104-118 and 136-138 and the table computer 126.

Like the initial poker hand, the draw cards can include the next five cards that are physically dealt from the shoe 120 by the dealer at or around the same time as the player's discard selection. The dealer may burn the top card in the shoe 120 (e.g., withdraw the top card from the shoe 120 without running it past the scanner 122 for detection) and/or the table computer 126 can automatically burn the top card in the shoe 120 (e.g., scanner 122 can disregard the top card and not reveal/use it to provide gaming action) before dealing cards that are used in initial card sets and draw sets. This can ensure that players will not be able to identify the top card from the shoe 120 in the event that some of the cards are marked.

Once the draw cards are identified, the discards can be replaced with the draw cards to create the player's final five-card draw poker hand (418). The player's discard selections can become automatically locked in before expiration of a timer (e.g., 15 seconds, 20 seconds, 30 seconds, etc.). The player can also affirmatively "lock-in" their discard selections prior to expiration of the timer in order to immediately receive the draw cards. The player can continue to play the game at their desired pace without having to wait for other players to perform their discard selections and/or lock in their selections.

The draw cards can be used to replace the discards in any of a variety of ways, such as through the techniques described with regard to FIGS. 2A-C. For example, the computer devices 104-118 and 136-138, the table computer 126, and/or the computer system 128 can replace the discarded cards from the initial poker hand for each player with the drawn cards in the order in which they were drawn. In another example, the devices 104-118 and 136-138, the table computer 126, and/or the computer system 128 can replace the discarded cards from the initial poker hand for each player with the drawn cards using starting draw positions that are assigned to each player so that the starting position from which the draw cards are selected can vary across the players. For instance, a first player can be assigned a starting draw position as the second draw card, which causes the draw cards to be inserted into open/discarded slots in the first player's hand starting with the second draw card and progressing sequentially through the remaining draw cards (third draw card→fourth draw card→fifth draw card→first draw card), as needed. However, a second player can be assigned a starting draw position as the fourth draw card, which causes the draw cards to be inserted into open/discarded slots for the fourth player's hand starting with the fourth draw card and progressing sequentially through the remaining draw cards (fifth draw card→first draw card→second draw card→third draw card), as needed. Accordingly, if the first player and the second player discard the same card from the initial hand at a same time, they will end up with different resulting poker hands, even though a same set of draw cards are used. If the first player and the second player discard the same cards from the initial hand but at different times, they will also end up with different resulting poker hands since they will receive sets of draw cards that were shuffled at different times and also have different draw positions. This configuration can be advantageous to ensure that no player has some advantage over another player by potentially knowing what cards will be shuffled into sets. This can introduce variance in the resulting hands, which can create varied outcomes and mitigate risk to the house.

In another example, the players can each have an assigned order in which the draw cards are selected to replace the discards each player has selected. For instance, the first player may have an assigned order of the fifth card→second card→fourth card→first card→third card, and a second player may have the opposite assigned order of the third card→first card→fourth card→second card→fifth card. In this example, if each of the first and second players select the same two cards to discard at a same time, they will receive two different draw cards to replace those discards—the fifth and second draw cards for the first player and the third and first draw cards for the second player—and will end up with different resulting hands. The first and second players in this example will only receive the same draw card if they each select three or more discards, and will receive the same resulting hands only if they each discard all five cards in the initial hand. Moreover, if the first and second players discard their cards at different times, they will receive sets of draw cards that were made at times at which the players discarded their cards. Coupled with the assigned orders of draw cards, the resulting hands can have increased variance, varied outcomes are more likely, and risk is mitigated to the house. The order of draw cards can be assigned to each player in any of a variety of ways.

The final five-card draw poker hands for each player can be evaluated and the five-card draw gaming outcome can be determined for each player (420). For example, the devices 104-118 and 136-138, the table computer 126, and/or the computer system 128 can determine which of the final five-card draw poker hands are winners and, if so, how much has been won by each player based on identification of the result of each of the final five-card draw poker hands (e.g., pair, three of a kind, full house, flush), the poker game that each player is playing, a comparison of each player's result with the winning hands for the game each player is playing (e.g., winning hands start at pair of jacks or better, winning hands start at three of a kind), and identification of odds for winning hands based on the type of winning hand and/or the bet amount. The determination of whether a player has won and how much the player has won can be made, for example, at the devices 104-118 and 136-138, the table computer 126, and/or the computer system 128. As discussed above, the determination of whether a player has won is based on the physical deal of the initial poker hand and the five draw cards, and the player gaming action (hold/discard selections).

Final hands and outcomes can be transmitted to and presented on the player devices (422). For example, the devices 104-118 and 136-138 can either generate and/or receive information identifying the final hands and the gaming outcomes (e.g., win, win amount, lose), and can output that information on the displays to the players. Gaming balances for players with winning hands can be credited (424). For example, the win amounts for players who have won based on the outcome of the final five-card draw poker hands can be credited to corresponding user accounts, which are identified by the unique identifiers described above. The technique 400 can be selectively repeated for each individual player—with each iteration of the technique 400 corresponding to a completed game of five-card draw poker using continuously shuffled sets of cards.

In another example, players can similarly switch between tables upon completing a five-card draw poker game (switch to a new table after the end of one iteration of the technique 400 and before starting another iteration of the technique 400). For example, a player can designate that he/she is ready to start another five-card draw poker game and can select an option to be switched to another table that is starting a new game, in response to which the player electronic touchscreen can be switched to gaming with cards dealt on another table. Other options for switching between tables are also possible, such as providing input (e.g., designating a bet for the new game), the user designating that he/she is ready to play a new game, the user designating that he/she wants to be moved to another table, and/or other options.

The system 100 and, particularly, the shoe 120 can be specifically adapted to provide for efficient and repeated five-card draw poker gaming, for example, using the technique 400. For example, the shoe 120 can be a six-deck continuous shuffle shoe such that multiple decks of cards can be shuffled together and dealt from the shoe 120. In alternative examples, the shoe 120 can include multiple decks other than six. The systems according to implementation of the present disclosure provide five-card draw poker gaming that are amenable to using multiple decks of cards that are all shuffled together and dealt from the shoe 120, as with other types of card-based gaming, like blackjack. For example, the six-deck continuous shuffle shoe 120 in the system described herein can provide for more efficient repeated game play (e.g., no need to shuffle between each game), without significantly reducing player odds, which may be more appealing to players than with convention five-card draw poker equipment. To maintain the same odds that are provided with conventional electronic five-card draw poker equipment and other electronic draw poker games while using physical cards in a configuration that allows for efficient and repeated game play, the shoe 120 and shuffling systems (e.g., automatic shuffling machines, human shufflers) can be adapted in a couple different ways. As mentioned above, the shoe 120 can be a six-deck continuous shuffle shoe. In another example, automatic shuffling machines can be adapted to receive multiple decks of cards, with each deck of cards being separated by a physical delimiter (e.g., plastic card separator, change in card orientation). The automatic shuffling machines can then shuffle each deck separately and output a stack of randomly shuffled decks, where each deck is separated by a physical delimiter. When dealing the cards from the shoe 120, the dealer 124 can deal ten cards from the first deck in the shoe 120 for the first five-card draw poker game and then discard the remainder of the cards from the first deck (at the conclusion of the first game), then deal ten cards from the second deck in the shoe 120 and then discard the remainder of the cards from the second deck, and so on until all of the decks have been dealt. By doing this, the dealer 124 can deal multiple five-card draw poker games without having to shuffle or obtain shuffled cards for each game, which can increase the pace of gameplay, and without having to resort to using multiple decks of cards, which could lower player odds for the game.

In another example, automatic shufflers can be adapted to output the first ten cards from each deck for placement in the shoe 120 (instead of the entirety of each deck) and then the dealer 124 can simply and continuously deal five-card draw poker games using the technique 400. By doing this, the gameplay can be made even more efficient by not requiring the dealer 124 to remove the remainder of the deck before starting a next game. This can present potential problems with keeping decks of cards separate from each other, which can be accomplished by marking cards with a unique identifier for the deck to which the card belongs (in addition to each card in a deck being marked with an identifier for the card (suit, card number)). An automatic shuffler can be programmed to receive a group of cards from mixed decks, to separate the cards into their respective decks based on the deck identifiers, and then to shuffle each deck separately from the other decks. If a deck is found to be incomplete after receiving all available cards, the cards from that deck can be discarded as being part of an incomplete deck. By doing this, the dealer 124 can more efficiently deal multiple five-card draw poker games without having to shuffle or obtain shuffled cards for each game, which can increase the pace of game play, and without having to resort to using multiple decks of cards, which could lower player odds for the game.

Automatic shufflers and the system 100 can additionally and/or alternatively be adapted to continuously shuffle and use decks with greater than 52 cards, such as decks that include one or more jokers. Each table can include one or more automatic shufflers, such as tables having two, three, or more automatic shufflers to concurrently shuffle multiple decks of cards. Shufflers can be configured to output cards in groups, such as outputting sets of five cards together that can be used as the initial hand and the draw cards. The automatic shufflers can accommodate one or more decks at a time.

Figure 5A:
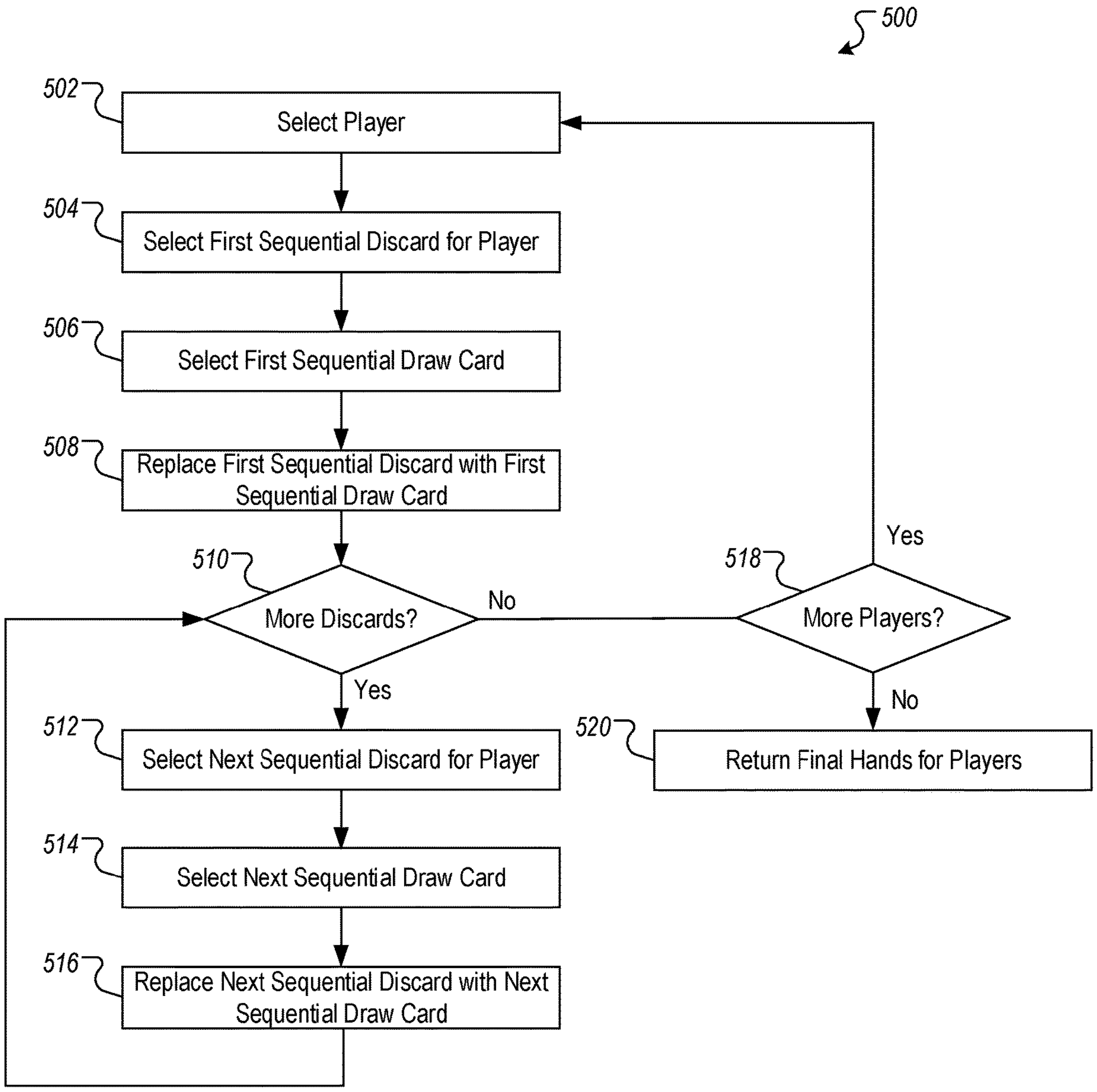
FIGS. 5A-B are flowcharts of example techniques for replacing discards in player hands from continuously dealt draw cards to generate a final resulting hand for each player.
Figure 5B:
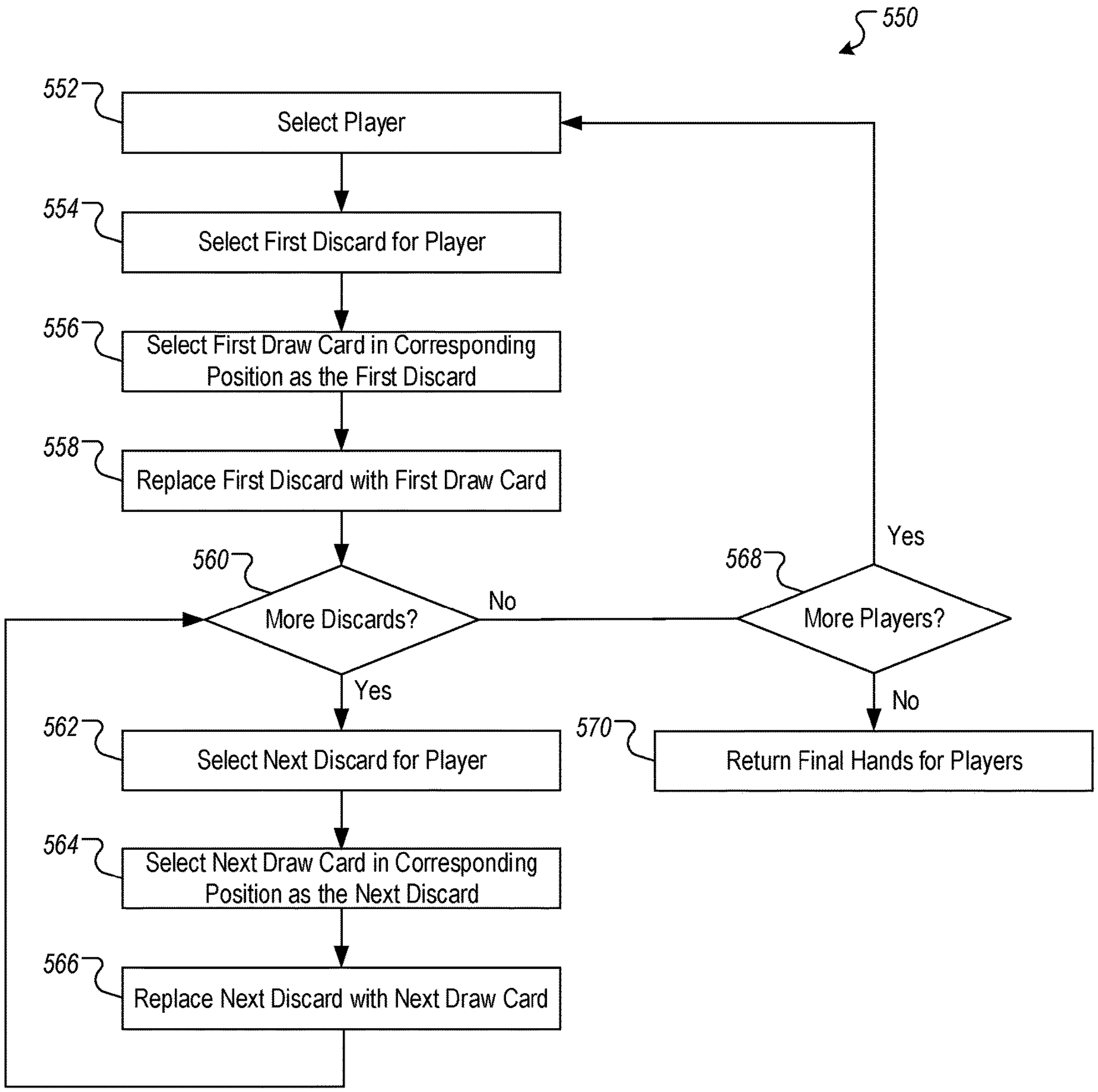

FIGS. 5A-B are flowcharts of example techniques 500 and 550 for replacing discards in player hands from continuously shuffled draw cards to generate a final resulting hand for each player. The example techniques 500 and 550 can be performed by any of a variety of appropriate computing equipment and/or systems, such as the table computer 126, the player computing devices 104-118 and 136-138, and the computer system 128. The techniques 500 and 550 can be performed, for example, as part of the technique 400, as described above with regard to FIG. 4.

Referring to FIG. 5A, the example technique 500 involves sequentially slotting a set of draw cards into open spots on a player's hand resulting from discards from the initial poker hand, starting with a first dealt draw card (first draw card) and concluding with the last dealt draw card (fifth draw card). The five draw cards can be viewed as each having a position that is established based on the order in which the draw cards were dealt in that set. The draw cards can be allocated to player hands starting with the draw card in the first position (first dealt card) and sequentially progressing through the remaining draw cards, as needed, to fill the open spots in each player's hand resulting from player discards from the initial hand. For example, a first player who discarded two cards at a first time, will receive the first draw card (draw card in the first position) and the second draw card (draw card in the second position). A second player who discarded three cards at the first time, will receive the first, second, and third draw cards from the same set as the first player. If the second player discarded three cards at a second time, then the second player can receive the first, second, and third draw cards from a set of draw cards that were dealt at the second time. Under this allocation of draw cards according to the technique 500, each player who discards the same cards from the initial hand at the same time can end up with the same resulting hand because the same draw cards from the same set will be allocated to fill the spots for the discarded cards. On the other hand, if each player discards the same cards from the initial hand but at different times, they can end up with different result hands because draw cards from different sets can be used to fill the spots for the discarded cards in each of the player's hands.

As part of the technique 500, a player who is playing (either physically or virtually) at a table is selected (502), and a first sequential discard for the player is selected (504). For example, referring to the example in FIGS. 2A-C, the Player 1 is selected and the first sequential discard for player 1 (card C2) is selected. A first sequential draw card (draw card in the first position) is selected from a set of draw cards (506) that were generated at or around the time that the player discarded the first sequential discard. The first sequential discard can then be replaced with the first sequential draw card (508). For example, continuing to refer to the example from FIGS. 2A-C, the first sequential draw card C6 is selected and is used to replace Player 1's first discard C2. A determination is made as to whether there are any more discards that need to be replaced with the same set of draw cards (510). If there are more discards, then the next sequential discard for the player is selected (512), a next sequential draw card is selected (514), and the next sequential draw card is used to replace the next sequential discard (516). For example, continuing to refer to the example from FIGS. 2A-C, the next sequential discard for Player 1 is card C4, which is replaced by the next sequential draw card, which is C7 (second draw card).

The steps 510-516 repeat until all discards from the selected player's initial hand have been replaced with draw cards that were generated at a same or similar time as the player discarded cards, with the replacement progressing sequentially from the first draw card in the set to the last (fifth) draw card in the set. Once all of the discards have been replaced, a check is done as to whether there are more players physically and/or virtually playing at the table who have not yet had their discards replaced with draw cards from the set (518). If there are more players, then the steps 502-516 are repeated for each player. Moreover, as described above, if the other players discard cards at different times, they can receive draw cards from sets that are generated at or around the different times. Thus, one or more players may not receive the same draw cards. Once each of the discards for each of the players at a table have been processed, the final resulting hands for the players can be returned (520) and used to determine gaming outcomes, for example, at step 424 in FIG. 4.

Referring to FIG. 5B, the example technique 550 is an alternate technique for replacing discards in each player's hand with continuously dealt draw cards in a way that can provide variation in the resulting player hands. In the technique 550, draw cards are slotted into open slots in each player's hand based on positions in the player's hand that are open. In other words, draw cards can be selected that are in a same, corresponding position as each of the discards in the player's hands. If a player discards a first card in their hand, then a first draw card can be selected. If a player discards a second card, then a second draw card can be selected, if the player discards a third card, then a third draw card can be selected, if the player discards a fourth card in their hand, then a fourth draw card can be selected, and if the player discards a fifth card in their hand, then a fifth draw card can be selected.

The steps of technique 550 are described below with regard to an illustrative example of this technique as depicted in FIGS. 2A and 2C, which depicts example gameplay using continuously dealt cards with an example card-based electronic five-card draw poker gaming system, such as the example system 100.

A player is selected (552) and a first discard for the player is selected (554). Referring to the example in FIGS. 2A and 2C, the example Player 1 has discarded card C7, in a second position in the player 1's hand. The first draw card in a corresponding position as the first discard can then be selected (556). In the example of FIGS. 2A and 2C, the draw card that was dealt in a same position as the first discard and at a same time as the time when the player 1 made the first discard (time=1) is card C7. Thus, card C7 can be selected (556). The first discard can be replaced with the first draw card (558). In the example of FIGS. 2A and 2C, the card C2 is replaced with card C7.

The player's hand is checked to determine whether there are any more discards for the player (560). If there are more discards, then the next sequential discard for the player is selected (562), the next sequential draw card in the same set in a corresponding position as the next sequential discard is selected (564), and the next sequential discard is replaced with the next selected sequential draw card (566). Continuing to refer to the example from FIGS. 2A and 2C, the next sequential discard for Player 1 is card C4 and the next sequential draw card based on the position of the card C4 is card C9. The card C4 is replaced with the selected card C9.

The steps 560-566 repeat until each of the discards made at the same time in the selected player's hand have been replaced according to this process. Once all of the discards have been replaced, then a determination is made as to whether there are any other players who have hands that need to be processed (568). If there are additional players, then the steps 552-566 are repeated for each of the players until hands for all of the players at the table have been processed using the continuously dealt sets of cards. In some examples, as described above, other players can perform discard actions at different times such that they receive draw cards from different sets of cards (where each of the different sets of cards are dealt at or around times that correspond to the times of the discard actions). As a result, the technique 550 can provide for more varied gaming outcomes and hands for all of the players.

For example, as shown in the example depicted in FIG. 2C, the player 2 can start the game at time=2 and therefore can receive an initial hand of cards that are dealt at time=2 (C11, C12, C13, C14, and C15). At time=1, the player N had discarded cards C6, C7, C8, and C9 from their initial hand 216, which were cards that were dealt at time=1. Accordingly, at time=2, C6, in a first position, is replaced with C11, in a corresponding first position in the dealt hand 208, C7, in a second position, is replaced with C12, in a corresponding second position in the dealt hand 208, C8, in a third position, is replaced with C13, in a corresponding third position in the dealt hand 208, and C9, in a fourth position, is replaced with C14, in a corresponding fourth position in the dealt hand 208. Thus, as shown in the example of FIG. 2C, not only are the draw cards selected based on position of the discarded cards, the set of draw cards is selected based on the time at which the player performs the discard action. As a result, the players can have different hands and outcomes can be more varied.

Once the discards in each of the players' hands have been processed, the final hands can be returned (570), such as returning the resulting hands 216, 218, and 220 for Player 1, 2, and N, respectively, in FIG. 2C. The returned cards can be used, for example, to determine gaming outcomes, for example, at step 424 in FIG. 4.

The techniques 500 and 550 can provide a variety of advantages. For example, the techniques 500 and 550 can introduce variation in the resulting hands and in the gaming outcomes for the players at a table, especially since each player can receive draw cards from different sets of cards. The techniques 500 and 550 can also create variation without using a random number generator or pseudo-random number generator. In another example, the techniques 500 and 550 can be implemented in a way that creates predictable and reliable gaming outcomes for players. By sequentially progressing through dealt draw cards or selecting dealt draw cards based on corresponding positions of discards, players can understand the flow of the game, how the draw cards are being selected to replace the discards, and can have more confidence in the fairness of the gaming system. Other advantages are also possible.

Figure 6A:
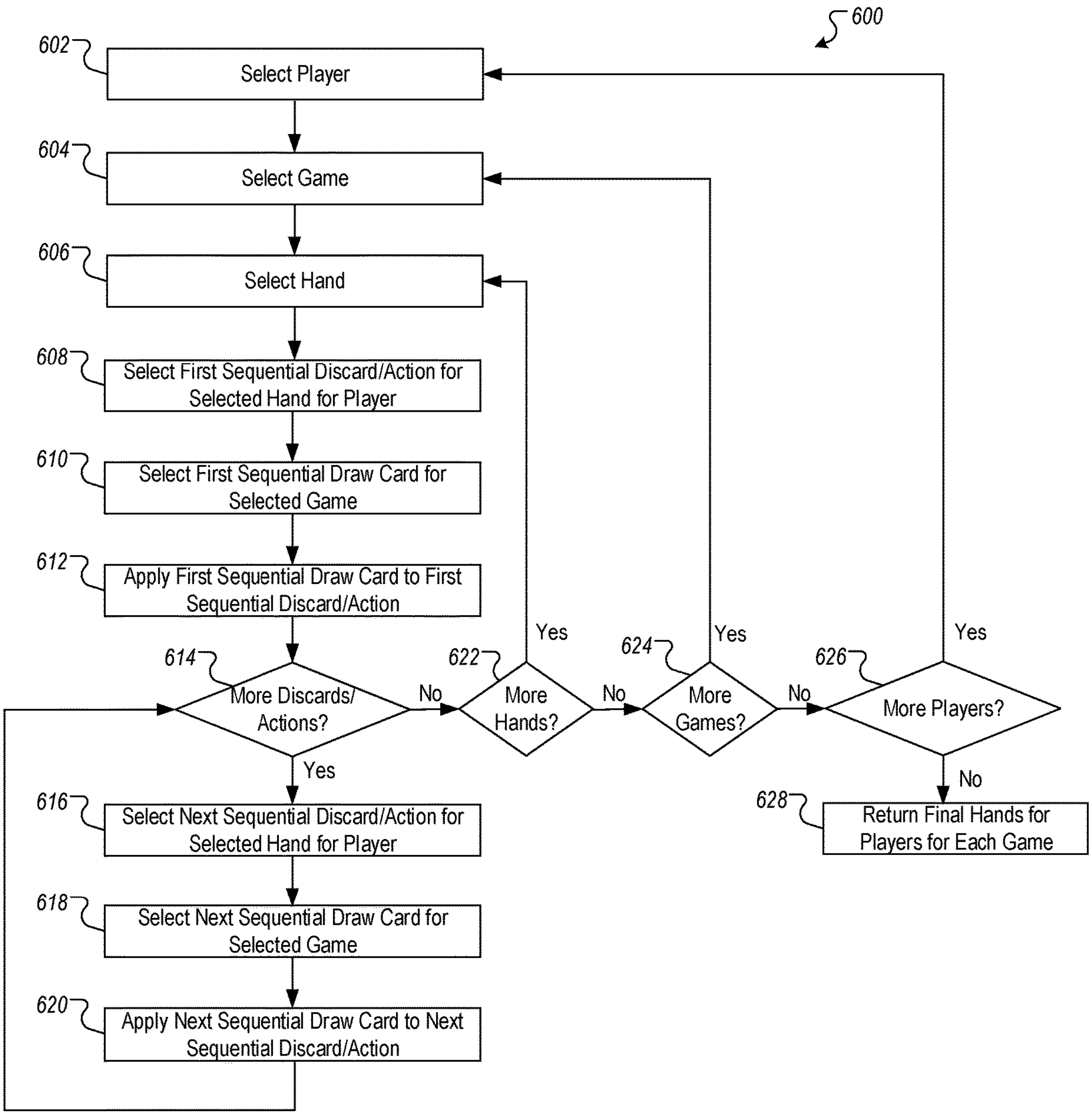
FIGS. 6A-B are flowcharts of other example techniques for replacing discards in player hands from continuously dealt draw cards to generate a final resulting hand for each player.
Figure 6B:
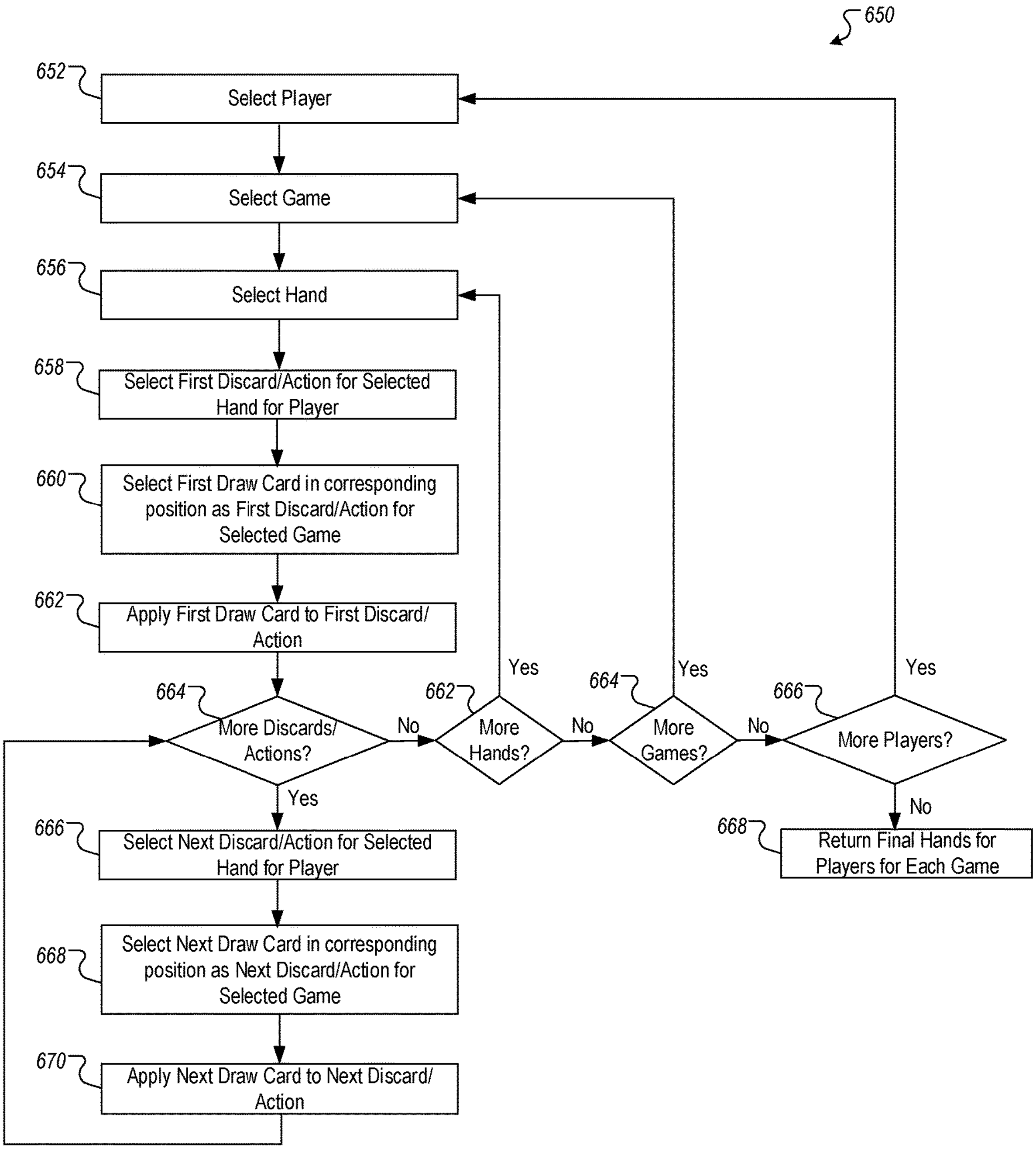

FIGS. 6A-B are flowcharts of other example techniques 600 and 650 for replacing discards in player hands from continuously dealt draw cards to generate a final resulting hand for each player. The example techniques 600 and 650 can be performed by any of a variety of appropriate computing devices and/or systems, such as the table computer 126, the computing devices 104-118 and 136-138, and the computer system 128. The techniques 600 and 650 can be performed, for example, as part of the techniques 400, 500, and/or 550 (e.g., refer to FIGS. 4 and 5A-B).

Referring to FIG. 6A, the example technique 600 is a technique for replacing discards in (e.g., draw poker) or providing additional cards (e.g., blackjack) to each player's hand with cards read in a sequential order from a dealt grid, such as the grid 300 in FIG. 3, or a section of the dealt grid designated for the current game, as shown in FIG. 3. In some implementations, the draw cards are selected from the same grid as the cards selected for the initial hand and are determined based on continuous reshuffling of cards in that grid. For example, referring to FIG. 3, if cards A1-A5 were used for the initial hand, the next draw card can be B1, then B2, and so forth. In some implantations, separate grids can be used to select cards for the initial hands and for the draw cards.

For games that require draw cards (e.g., draw poker), the cards selected for a player's initial hand from a grid can be viewed as each having a position that is established based on the order in which the draw cards were selected (e.g., the cards order in the grid) or based on an order assigned to the cards in the initial hand. When draw cards are read from the same grid or grid section as the initial cards, the starting position in the grid for reading the draw card can be the next sequential card after the last card selected for the initial hand. When the draw cards are read from another grid than the cards read for the initial hand, the starting position in the other grid for reading the draw card can be the first card in the other grid or section of the other grid allocated to the particular game for which the cards are being selected. Draw cards are selected by sequentially progressing through the remaining cards in the grid or grid section to fill the open spots in each player's hand resulting from player discards from the initial hand. For example, referring to grid 300 in FIG. 3, if cards A1-A5 were used as players' initial hands, the next sequential positon would be B1. A first player who discarded two cards at a first time, will receive the next two sequential cards in the grid, B1 and B2. A second player who discarded three cards at the same time will receive the cards B1, B2, and B3. On the other hand, if the second player discarded three cards at a different time, then the second player can receive cards that were dealt in the grid at the different time. For example, the cards C1, C2, and C3 can be dealt at the same time or around the same time that the second player discarded three cards. Thus, the second player can receive the cards C1, C2, and C3 instead of the cards B1, B2, and B3, which were dealt at a different time.

As part of the technique 600, a player who is playing (either physically or virtually) at a table is selected (602). A game played by the selected player is selected (604), followed by selecting (606) a hand for the particular selected game and player. A first sequential discard or other action for the selected hand is selected (608), a first sequential draw card is read from the grid or section of the grid (610), and the first sequential draw card is used to replace the first sequential discard (612). A determination is made as to whether there are any more discards or other actions that need to be replaced with additional draw cards from the same set of draw cards (614). If there are more discards, then the next sequential discard card for the player is selected (616), a next sequential draw card in the same set is read from the grid or section of the grid (618), and the next sequential draw card is used to replace the next sequential discard (620).

The steps 614-620 repeat until all discards made at the same time from the selected player's initial hand have been replaced with draw cards from the grid or grid section. Once all of the discards have been replaced, a check is done as to whether there are more hands that the player is playing in the selected game that have not yet had its discards replaced with draw cards read from the grid or grid section for the game (622). If there are more hands for that player in the selected game, then steps 606-620 are repeated for each hand. As described above, the discards can be replaced with cards from different sets of draw cards, where each set of draw cards is shuffled/dealt at a same or similar time as the time at which the player discards cards in each game. Once all of the discards have been replaced for each of a player's hands in a selected game, a check is done as to whether there are more games that the player is playing that have not yet had its respective hands discards replaced (624). If there are more games for that player, then steps 604-620 are repeated for each game. Once all of the discards have been replaced for each of a player's hands in all of the games in which the player is participating, a check is done as to whether there are more players physically and/or virtually playing at the table who have not yet had their discards replaced (626). If there are more players, then the steps 602-620 are repeated for each player. Once each of the discards for each of the players at a table have been processed using cards read in sequential order from the grid or appropriate grid section, the final resulting hands for the players can be returned (628) and used to determine gaming outcomes, as described above.

Referring to FIG. 6B, the example technique 650 is an alternate technique for replacing discards in (or providing additional cards to) each player's hand with cards based on positions of each discarded card in the player's hand. As with the example technique 600, the draw cards may be selected from the same grid as the cards selected for the initial hand or another grid for the draw cards. The draw cards are then selected based on which position cards are discarded from the player's hand. As described in reference to the technique 550 in FIG. 5B, if a first player discards a card in a second position from their hand at a first time, then a draw card in a second position in a set of cards that were generated at or around the first time can be selected to replace the first discard.

As part of the technique 650, a player who is playing (either physically or virtually) at a table is selected (652). A game played by the selected player is selected (654), followed by selecting (656) a hand for the particular selected game and player. A first discard or other action for the selected hand of the player is selected (658). Then, a first draw card in a corresponding position as the first discard for the game is selected and read from the grid or section of the grid for the current game (660). The first draw card is then used to replace the first discard (662). A determination is made as to whether there are any more discards or other actions taken by the player at the current time (664). If there are more discards or actions, then the next discard card for the player is selected (666), a next draw card is read from the grid or section of the grid in a corresponding position as the next discard (668), and the next draw card is used to replace the next discard (670).

The steps 664-670 repeat until all discards from the selected player's initial hand have been replaced with draw cards from the grid or grid section at the current time. Once all of the discards have been replaced, a check is done as to whether there are more hands that the player is playing in the selected game that have not yet had its discards replaced with draw cards read from the grid or grid section for the game (662). If there are more hands for that player in the selected game, then steps 656-670 are repeated for each hand, using draw cards that are dealt at or around a time at which the player performs discard actions for each of the hands. Once all of the discards have been replaced for each of a player's hands in a selected game, a check is done as to whether there are more games that the player is playing that have not yet had its respective hands discards replaced (664). If there are more games for that player, then steps 654-670 are repeated for each game, using draw cards that are dealt at or around a time at which the player performs actions in each of the games. Once all of the discards have been replaced for each of a player's hands in all of the games in which the player is participating, a check is done as to whether there are more players physically and/or virtually playing at the table who have not yet had their discards replaced (666). If there are more players, then the steps 652-670 are repeated for each player using draw cards that are dealt at same or similar times as when each of the players performs actions with regards to particular games and hands. Each of the players can be dealt draw cards from different sets of cards, thereby increasing variance in outcomes and ensuring that players have diversified hands. Once each of the discarded cards from each of the players at a table have been processed using cards read in sequential order from the grid or appropriate grid section, the final resulting hands for the players can be returned (668) and used to determine gaming outcomes, as described herein.

As an example of employing technique 650 within an electronic gaming system with reference to grid 300 from FIG. 3, the cards in Game A section if grid 300 may be used for a five-card draw poker game, where cards in row 302 (A1-A5) are used for draw cards at a first time and the cards in row 304 (B1-B5) are used for the draw cards at a second time. Thus, a first and second player can start the game at the same time (e.g., time=0) and receive a same initial hand. However, the first player can perform a discard action before the second player performs a discard action. The first player can then receive draw cards from the row 302 because the first player made the discard action at or around the first time, while the second player can receive draw cards from the row 304 because the second player made the discard action at or around the second time.

Sometimes, one or more other rows in the grid 300 can be used to provide draw cards to players that perform discard actions at different times. Thus, the entire grid 300 may be used for the five-card draw poker game. In such an implementation, the cards in row A1-A5 may be used as players' initial hands, however, the draw cards may be selected sequentially outside of the Game A section.

Figure 7A:
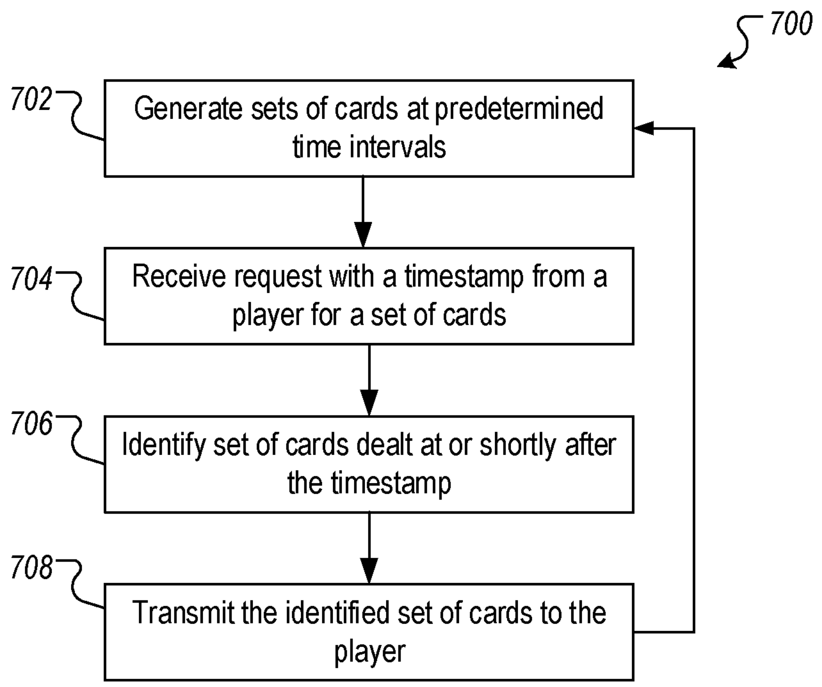
FIGS. 7A-C are flowcharts of example techniques for transmitting sets of replacement cards to player devices.
Figure 7B:
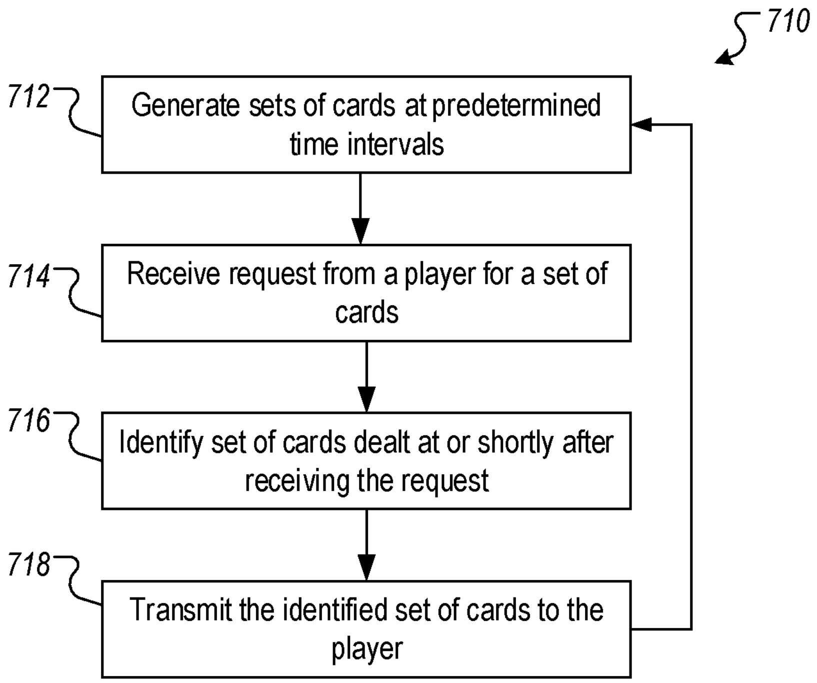
Figure 7C:
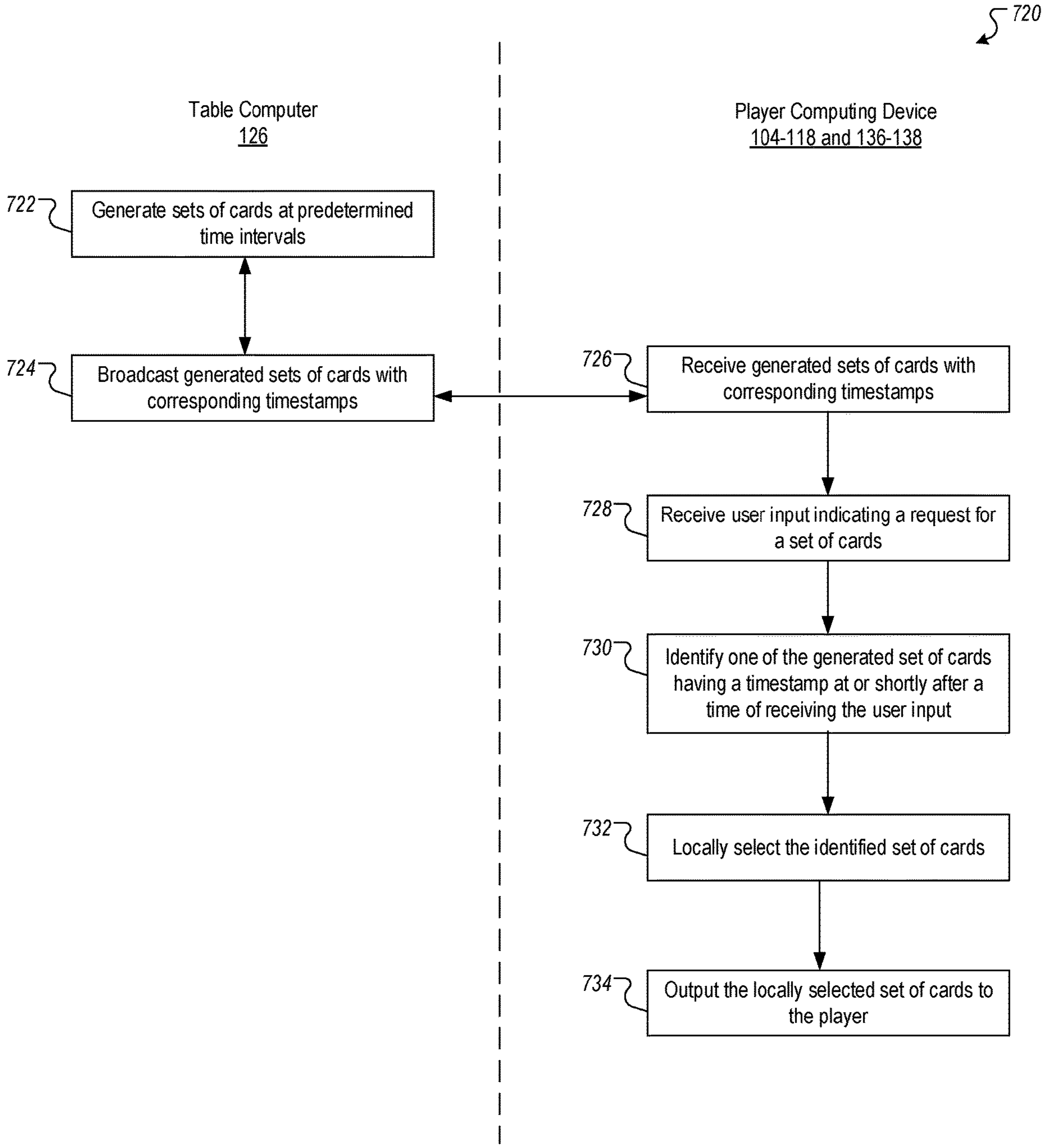

FIGS. 7A-C are flowcharts of example techniques 700, 710, and 720 for transmitting sets of replacement cards to player devices. The techniques 700, 710, and 720 can be used to maximize output in terms of numbers of cards being played in a period of time. The example techniques 700, 710, and 720 can be performed by any of a variety of appropriate computing devices and/or systems, such as the table computer 126, the computing devices 104-118 and 136-138, and the computer system 128. The techniques 700, 710, and 720 can be performed, for example, as part of the techniques 300, 400, 500, 550, 600, and/or 650 (e.g., refer to FIGS. 3-6).

Referring to the technique 700 in FIG. 7A, sets of cards can be generated at predetermined time intervals (702). As described above in reference to FIGS. 1-2, the dealer (such as the dealer 124) can continuously deal sets of cards at the dealer's desired pace (e.g., as quickly as the dealer can deal and scan sets of cards). Each set of cards that is generated can include a timestamp indicating a time at which the set is generated and/or scanned by the scanner 122. Sometimes, the timestamp can be a relative timing that takes into consideration a time when the cards are physically dealt and a time at which the cards are scanned and registered by the table computer 126. Sets of cards can be continuously generated and scanned throughout the technique 700.

The table computer 126 can receive a request from a player device for a set of cards (e.g., an initial hand, a replacement set) (704). The request can include a timestamp. The timestamp can indicate a time at which the player performed some action in the game, such as selecting an option to begin a new game or discarding one or more cards from the player's hand. The timestamp can also indicate a time at which the request for the set of cards is transmitted and/or received by the table computer 126.

The table computer 126 can then identify a set of cards that were dealt (702) at or shortly after the timestamp in the request (706). For example, the table computer 126 can determine which set of cards has been dealt within a predetermined threshold time range from the timestamp in the request. The table computer 126 can compare a timestamp of each set of dealt cards with the timestamp in the request. A set of cards having the same timestamp can be selected (706). In some implementations, a set of cards having a timestamp within a threshold amount of time after the timestamp in the request can be identified. In other implementations, a set of cards having a timestamp within a threshold amount of time before the timestamp in the request can be identified. In yet some implementations, if the timestamp in the request falls within the timestamps of a first set of cards and a second set of cards, the second set of cards can be selected to enhance game security (e.g., to ensure that no player has an upper hand or advantage on other players in the game). If game security would be unaffected by selection of a set of cards, then the first set of cards can be selected in order to increase pace of gameplay.

Moreover, in some implementations, selection of a set of cards can be based on decisions made based on timing of decisions that are made by a player, rather than the timestamp in the request. For example, if the player makes a decision prior to a fifth card in a current set of cards being drawn, then the player would receive that current set of five cards. If the player makes a decision after the timestamp of the fifth card in the current set of cards that are being drawn, then the player would receive a next set of five cards that are drawn by the dealer. After the set of cards are selected in 706, the table computer 126 can transmit the identified set of cards to the player (708).

Referring to the technique 710 in FIG. 7B, sets of cards can be generated at predetermined time intervals (712). Refer to step 702 in the technique 700 depicted in FIG. 7A. The table computer 126 can receive a request from a player device for a set of cards (714). The request may not include a timestamp. Accordingly, unlike the technique 700, the table computer 126 can identify a set of cards that were dealt at or shortly after receiving the request (716). The table computer 126 can then transmit the identified set of cards to the player's device (718).

Referring to the technique 720 in FIG. 7C, sets of cards can be generated at predetermined time intervals (722). As described in reference to FIG. 7A, the dealer can continuously deal sets of cards, which can be scanned by the scanner and detected or otherwise registered by the table computer 126. The table computer 126 can then broadcast the sets of cards with corresponding timestamps (724). The table computer 126 can broadcast each set of cards as they are generated. Other times, the table computer 126 can broadcast sets of cards in batches (e.g., broadcast 2 sets of cards at a time, where each set has a different timestamp indicating when they were generated). The sets can be broadcasted to all player computing devices 104-118 and 136-138, regardless of whether players are actually playing the games at such devices. Sometimes, the sets can be broadcasted only to those devices 104-118 and 136-138 where players are currently playing the game. For example, the table computer 126 can receive notifications from the devices 104-118 an 136-138 that indicate that a player has started a game or taken some action in a game. The table computer 126 can then broadcast the sets of cards to only those devices.

The player computing devices 104-118 and 136-138 can receive the generated sets of cards with their corresponding timestamps (726). The devices 104-118 and 136-138 can also receive user input indicating a request for a set of cards (728). The user input can be some action that is taken in the game by the player. For example, the player can select an option to start a game, which can be user input indicating that player user needs an initial hand of cards. The player can also discard cards in their current hand, which can be user input indicating that the player needs replacement cards.

Sometimes, the user input can be received before one or more of the generated sets of cards are received. Sometimes, the user input can be received at a same time as one or more of the generated sets of cards. Moreover, as described above, the devices 104-118 and 136-138 can continuously receive the generated sets of cards, regardless of when the devices 104-118 and 136-138 receive user input indicating a request for a set of cards.

The devices 104-118 and 136-138 can identify one of the generated sets of cards having a timestamp that is at or shortly after a time that the devices received the user input (730). For example, the devices 104-118 and 136-138 can temporarily store the sets of cards that are broadcasted by the table computer 126 in 724 and received in 726. The devices 104-118 can look at the timestamps for each of the sets of cards in temporary storage and determine which timestamp falls within some predetermined threshold range of time from the time of the request for a set of cards. A set of cards that were dealt at a same time as the request can be identified. A set of cards that were dealt within a threshold amount of time after the request was received can be identified. In some implementations, a set of cards that were dealt within a threshold amount of time before the request was received can be identified.

The devices 104-118 and 136-138 can then locally select the identified set of cards (732). Performing steps 730-732 at each of the devices 104-118 and 136-138 can be advantageous to more efficiently utilize computational resources, especially at the table computer 126. The table computer 126 can then operate more efficiently and quickly since it does not have to determine, for each player, which set of cards each device 104-118 and 136-138 should receive.

Finally, the devices 104-118 and 136-138 can output the locally selected set of cards to the player (734). The player can then take some action in the game based on their updated hand, and the steps 722-734 can be repeated until the game ends/a player wins.

Figure 8:
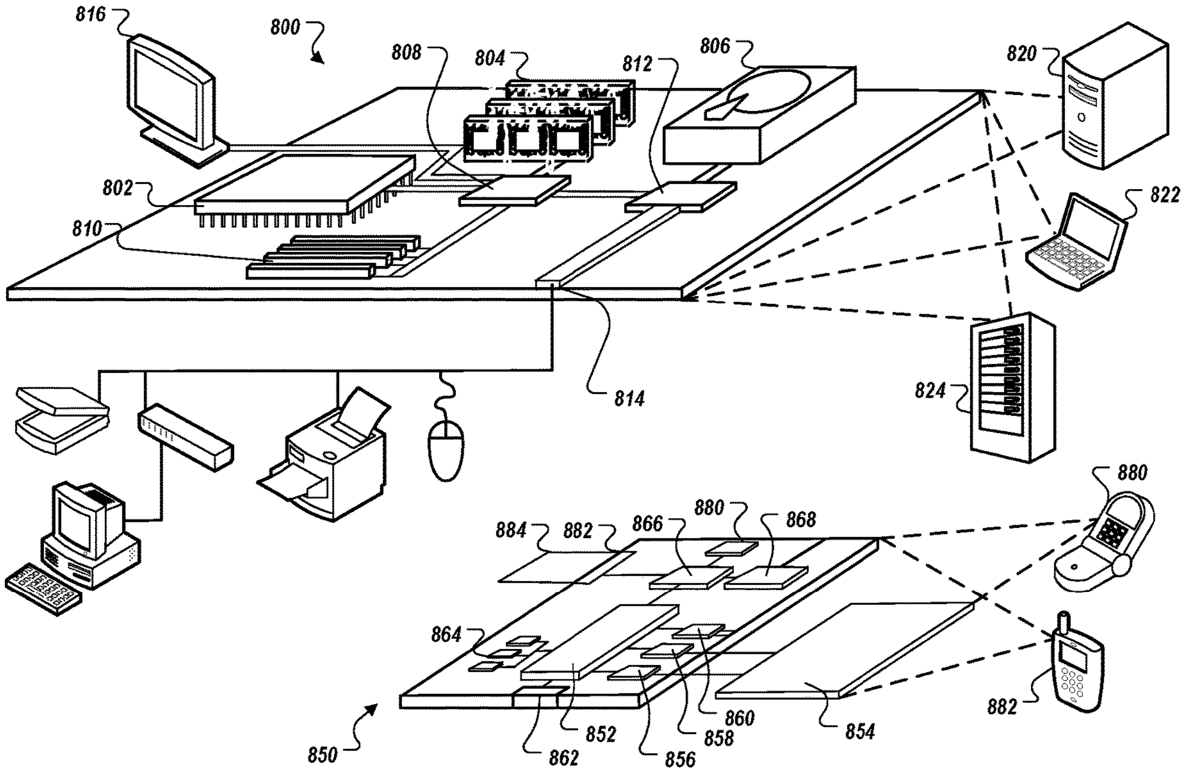
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. An electronic gaming system using common physical cards, the system comprising:

a plurality of physical playing cards;

a scanner that is configured to identify each of the plurality of physical playing cards as they are dealt by a dealer;

a gaming table where the plurality of physical playing cards are dealt and identified by the scanner;

a plurality of player computing equipment with graphical displays that are programmed to provide individualized gaming interfaces for a plurality of players, the individualized gaming interfaces each being programmed to:

output a virtual poker hand for a corresponding player, receive user input to perform one or more discard actions with regard to the virtual draw poker hand, and transmit, to a gaming computing system, a request for a set of replacement cards;

a gaming computing system that is communicably connected to the scanner and the plurality of player computing equipment, the gaming computing system being programmed to, based on a plurality of candidate sets being continuously dealt by the dealer independent of player actions and the scanner detecting each physical playing card in the plurality of candidate sets as the physical playing cards are successively dealt by the dealer:

continuously identify the plurality of candidate sets of the physical playing cards;

assign a dealt timestamp to each of the plurality of candidate sets of the physical playing cards that is identified, wherein the dealt timestamp indicates a time at which the candidate set of the physical playing cards is (i) dealt by the dealer or (ii) detected by the scanner;

receive, from a first player computing device of the plurality of player computing devices, a first request for cards, the first request is received at a first request timestamp while the plurality of candidate sets of the physical playing cards are being continuously identified;

receive, from a second player computing device of the plurality of player computing devices, a second request for cards, the second request is received at a second request timestamp while the plurality of candidate sets of the physical playing cards are being continuously identified;

select, among the plurality of candidate sets of the physical playing cards, a first set of the physical playing cards for the first player computing device based on a comparison of the first request timestamp to the dealt timestamp of each of the plurality of candidate sets of the physical playing cards, wherein the first set of the physical playing cards is selected based on the first set of physical playing cards having a corresponding dealt timestamp that is the same as or immediately before the first request timestamp;

select, among the plurality of candidate sets of the physical playing cards, a second set of the physical playing cards for the second player computing device based on a comparison of the second request timestamp to the dealt timestamp of each of the plurality of candidate sets of the physical playing cards, wherein the second set of the physical playing cards is selected based on the second set of physical playing cards having a corresponding dealt timestamp that is the same as or immediately before the second request timestamp;

transmit, to the first player computing device, data representative of the first set of the physical playing cards, wherein the data includes graphical representations of the physical playing cards in the first set for presentation in a graphical display of the first player computing device; and transmit, to the second player computing device, data representative of the second set of the physical playing cards, wherein the data includes graphical representations of the physical playing cards in the second set for presentation in a graphical display of the second player computing device.

2. The system of claim 1, wherein the gaming computing system receives the first request and the second request at different times.

3. The system of claim 1, wherein the first request is generated at the first player computing device at a different time from a time when the second request is generated at the second player computing device.

4. The system of claim 1, wherein the first request for cards includes a second timestamp transmitted from the first player computing device, the second timestamp transmitted from the first player computing device being at a time that is later than the first request timestamp transmitted from the first player computing device, wherein the second timestamp transmitted from the first player computing device is similar to or within a threshold time of the second request timestamp transmitted from the second player computing device.

5. The system of claim 4, wherein the gaming computing system is programmed to:

identify the second set of the physical playing cards that has been dealt by the dealer or detected by the scanner at or immediately before the second timestamp transmitted from the first player computing device and the second request timestamp transmitted from the second player computing device; and transmit the second set of the physical playing cards to the first player computing device and the second player computing device, respectively.

6. The system of claim 5, wherein the second set of the physical playing cards is used as an initial hand for the second player computing device and a replacement set for the first player computing device.

7. The system of claim 1, wherein the gaming computing system receives the first request and the second request at different times.

8. The system of claim 1, wherein the first request is generated at the first player computing device at a different time from a time when the second request is generated at the second player computing device.

9. The system of claim 1, wherein the gaming computing system receives the first request and the second request at the same time, and wherein the first set of the physical playing cards is the same as the second set of the physical playing cards.

10. The system of claim 1, wherein the first set of the physical playing cards is different than the second set of the physical playing cards.

11. The system of claim 1, wherein the first request for cards is received based on a discard action being performed at the first player computing device, wherein the discard action comprises discarding between zero and five cards from the initial poker hand of the corresponding player, wherein the first set of the physical playing cards are in a card sequence, and wherein the gaming computing system is further programmed to:

replace, based on at least one card having been discarded, a first discarded card from the initial poker hand with a first card from the card sequence of the first set of the physical playing cards;

replace, based on at least two cards having been discarded, a second discarded card from the initial poker hand with a second card from the card sequence of the first set of the physical playing cards;

replace, based on at least three cards having been discarded, a third discarded card from the initial poker hand with a third card from the card sequence of the first set of the physical playing cards;

replace, based on at least four cards having been discarded, a fourth discarded card from the initial poker hand with a fourth card from the card sequence of the first set of the physical playing card; and replace, based on all five cards from the initial poker hand having been discarded, a fifth discarded card from the initial poker hand with a fifth card from the card sequence of the first set of the physical playing cards.

12. The system of claim 1, wherein the second request for cards is received based on a discard action being performed at the second player computing device, wherein the discard action comprises discarding between zero and five cards from the initial poker hand of the corresponding player, wherein the second set of the physical playing cards are in a card sequence, and wherein the gaming computing system is further programmed to:

replace, based on at least one card having been discarded, a first discarded card from the initial poker hand with a first card from the card sequence of the second set of the physical playing cards;

replace, based on at least two cards having been discarded, a second discarded card from the initial poker hand with a second card from the card sequence of the second set of the physical playing cards;

replace, based on at least three cards having been discarded, a third discarded card from the initial poker hand with a third card from the card sequence of the second set of the physical playing cards;

replace, based on at least four cards having been discarded, a fourth discarded card from the initial poker hand with a fourth card from the card sequence of the second set of the physical playing card; and replace, based on all five cards from the initial poker hand having been discarded, a fifth discarded card from the initial poker hand with a fifth card from the card sequence of the second set of the physical playing cards.

13. The system of claim 1, wherein at least a portion of the plurality of player computing equipment are remote from a facility where the gaming table is located or remote from the gaming table in the same facility where the gaming table is located.

14. The system of claim 1, wherein the scanner includes one or more of: an RFID reader, an optical scanner, a barcode scanner, and a camera.

15. The system of claim 1, wherein the dealer is at least one of a human and a robot.

16. An electronic gaming system using common cards, the system comprising:

a gaming computing system that is communicably connected to a scanner and a plurality of player computing equipment, wherein the scanner identifies each of a plurality of physical playing cards as they are dealt by a dealer, wherein the plurality of player computing equipment has graphical displays that are programmed to provide individualized gaming interfaces for a plurality of players, wherein at least a portion of the plurality of player computing equipment is remote from a gaming table where the plurality of physical playing cards are dealt and identified by the scanner, the gaming computing system being programmed to, based on a plurality of candidate sets being continuously dealt by the dealer independent of player actions and the scanner detecting each physical playing card in the plurality of candidate sets as the physical playing cards are successively dealt by the dealer:

continuously identify the plurality of candidate sets of the physical playing cards;

assign a dealt timestamp to each of the plurality of candidate sets of the physical playing cards that is identified, wherein the dealt timestamp indicates a time at which the candidate set of the physical playing cards is (i) dealt by the dealer or (ii) detected by the scanner;

receive, from a first player computing device of the plurality of player computing devices, a first request for cards, the first request is received at a first request timestamp while the plurality of candidate sets of the physical playing cards are being continuously identified;

receive, from a second player computing device of the plurality of player computing devices, a second request for cards, the second request is received at a second request timestamp while the plurality of candidate sets of the physical playing cards are being continuously identified;

select, among the plurality of candidate sets of the physical playing cards, a first set of the physical playing cards for the first player computing device based on a comparison of the first request timestamp to the dealt timestamp of each of the plurality of candidate sets of the physical playing cards, wherein the first set of the physical playing cards is selected based on the first set of physical playing cards having a corresponding dealt timestamp that is the same as or immediately before the first request timestamp;

select, among the plurality of candidate sets of the physical playing cards, a second set of the physical playing cards for the second player computing device based on a comparison of the second request timestamp to the dealt timestamp of each of the plurality of candidate sets of the physical playing cards, wherein the second set of the physical playing cards is selected based on the second set of physical playing cards having a corresponding dealt timestamp that is the same as or immediately before the second request timestamp;

transmit, to the first player computing device, data representative of the first set of the physical playing cards, wherein the data includes graphical representations of the physical playing cards in the first set for presentation in a graphical display of the first player computing device; and transmit, to the second player computing device, data representative of the second set of the physical playing cards, wherein the data includes graphical representations of the physical playing cards in the second set for presentation in a graphical display of the second player computing device.

17. The system of claim 16, wherein:

the first request for cards includes a second timestamp transmitted from the first player computing device, the second timestamp transmitted from the first player computing device being at a time that is later than the first request timestamp transmitted from the first player computing device, wherein the second timestamp transmitted from the first player computing device is similar to or within a threshold time of the second request timestamp transmitted from the second player computing device, and wherein the gaming computing system is programmed to:

identify the second set of the physical playing cards that has been dealt by the dealer or detected by the scanner at or immediately before the second timestamp transmitted from the first player computing device and the second request timestamp transmitted from the second player computing device; and transmit the second set of the physical playing cards to the first player computing device and the second player computing device, respectively.

18. The system of claim 17, wherein the second set of the physical playing cards is used as an initial hand for the second player computing device and a replacement set for the first player computing device.

19. The system of claim 16, wherein the gaming computing system receives the first request and the second request at different times.

20. The system of claim 16, wherein the first request is generated at the first player computing device at a different time from a time when the second request is generated at the second player computing device.

* * * * *